(12) United States Patent
Hays et al.

(10) Patent No.: US 7,861,974 B2
(45) Date of Patent: Jan. 4, 2011

(54) DOCKING SYSTEM

(75) Inventors: Anthony Beckman Hays, Jackson, MI (US); Greg Alan Ritter, Hamburg, MI (US); Peter Tchoryk, Jr., Ann Arbor, MI (US); Jane Camile Pavlich, Ann Arbor, MI (US); Gregory Joseph Wassick, Petersburg, MI (US)

(73) Assignee: Michigan Aerospace Corporation, Ann Arbor, MI (US)

(*) Notice: Subject to any disclaimer, the term of this patent is extended or adjusted under 35 U.S.C. 154(b) by 0 days.

(21) Appl. No.: 12/406,955

(22) Filed: Mar. 18, 2009

(65) Prior Publication Data

US 2009/0173832 A1 Jul. 9, 2009

Related U.S. Application Data

(63) Continuation of application No. 12/263,498, filed on Nov. 2, 2008, which is a continuation-in-part of application No. 10/907,091, filed on Mar. 18, 2005, now abandoned, application No. 12/406,955, which is a continuation-in-part of application No. 10/907,091.

(60) Provisional application No. 60/554,763, filed on Mar. 18, 2004.

(51) Int. Cl.
*B64G 1/64* (2006.01)
(52) U.S. Cl. .................. 244/172.4; 244/172.5
(58) Field of Classification Search ............. 244/172.4, 244/172.5, 135 A; 24/158.1, 159.4
See application file for complete search history.

(56) References Cited

U.S. PATENT DOCUMENTS 2,199,588 A 5/1940 Cobham et al.
2,716,527 A * 8/1955 Latimer-Needham .......... 244/3
2,761,636 A 9/1956 Finlay
3,009,729 A 11/1961 Eakin (Continued)

OTHER PUBLICATIONS

Tchoryk Jr., P.; M.E. Dobbs, D.J. Apley, D.J. Conrad, M.P. Frazer, D.K. Slayton, "Autonomous Rendezvous and Docking Using an Expendable Launch Vehicle," AIAA/Utah State University Conference on Small Satellites, Poster Paper, Logan, Utah, Aug. 27-29, 1991.

(Continued)

*Primary Examiner*—Tien Dinh
*Assistant Examiner*—Philip J Bonzell
(74) *Attorney, Agent, or Firm*—Raggio & Dinnin, P.C.

(57) ABSTRACT

A convex forward surface of a forward-biased probe head of a first portion of a docking system engages a central concave conical surface of a second portion of the docking system. A first linear actuator moves a flexible docking cable assembly relative to a support structure through bores therein and through the probe head. An aftward retraction of the docking cable assembly causes a linearly-actuated cam element thereof to rotate a rotary cam follower pivoted from the support structure, which engages an aft edge portion of the probe head, forcing the probe head forward. A plurality of distal coupling elements operatively coupled to the support structure around a central axis thereof engage with and become releasably captured by a corresponding socket and associated capture mechanism of a mating second portion of the docking system, and rigidized when the probe head is forced against the central concave conical surface.

16 Claims, 14 Drawing Sheets

U.S. PATENT DOCUMENTS

| | | | |
|---|---|---|---|
| 3,201,065 A | | 8/1965 | Dunn |
| 3,389,877 A | | 6/1968 | Huber et al. |
| 3,478,986 A | | 11/1969 | Fogarty |
| 3,508,723 A | * | 4/1970 | Warren et al. ............ 244/172.4 |
| 3,608,848 A | | 9/1971 | Cantor et al. |
| 3,737,117 A | | 6/1973 | Belew |
| 3,753,536 A | | 8/1973 | White |
| 3,809,002 A | * | 5/1974 | Nagy et al. .................. 114/249 |
| 3,938,461 A | | 2/1976 | Marriner |
| 4,083,520 A | | 4/1978 | Rupp et al. |
| 4,119,051 A | | 10/1978 | Orndorff, Jr. |
| 4,177,964 A | * | 12/1979 | Hujsak et al. ............ 244/172.4 |
| 4,195,804 A | | 4/1980 | Hujsak et al. |
| 4,381,092 A | | 4/1983 | Barker |
| 4,391,423 A | | 7/1983 | Pruett et al. |
| 4,431,333 A | | 2/1984 | Chandler |
| 4,500,057 A | | 2/1985 | Duweiz |
| 4,573,725 A | | 3/1986 | Griffiths |
| 4,588,150 A | | 5/1986 | Bock et al. |
| 4,607,815 A | * | 8/1986 | Turci et al. ............... 244/172.4 |
| 4,709,454 A | | 12/1987 | Barnes |
| 4,712,753 A | | 12/1987 | Howard |
| 4,906,123 A | | 3/1990 | Weskamp et al. |
| 4,964,596 A | | 10/1990 | Ganssle et al. |
| 5,253,944 A | | 10/1993 | Preston |
| 5,364,046 A | * | 11/1994 | Dobbs et al. ............. 244/172.4 |
| 5,429,328 A | * | 7/1995 | Dobbs et al. ............. 244/172.5 |
| 5,735,488 A | | 4/1998 | Schneider |
| 6,299,107 B1 | * | 10/2001 | Kong et al. ............... 244/172.4 |
| 6,742,745 B2 | | 6/2004 | Tchoryk et al. |
| 6,767,155 B2 | | 7/2004 | O'Brien et al. |
| 6,935,805 B2 | | 8/2005 | O'Brien et al. |
| 6,969,030 B1 | | 11/2005 | Jones et al. |
| 7,104,505 B2 | | 9/2006 | Tchoryk et al. |
| 7,374,134 B2 | | 5/2008 | Collyer et al. |
| 2004/0245405 A1 | | 12/2004 | Tchoryk et al. |
| 2005/0263649 A1 | | 12/2005 | Ritter et al. |
| 2007/0210212 A1 | | 9/2007 | Tchoryk, Jr. et al. |
| 2009/0146011 A1 | | 6/2009 | Ritter et al. |
| 2009/0173833 A1 | | 7/2009 | Ritter et al. |

OTHER PUBLICATIONS

Quintero, Montgomery, Tchoryk, "Autonomous Rendezvous and Docking Scenarios for Guidelines and Standards," AIAA Space Programs Conference Proceedings, Huntsville, AL, Sep. 21-23, 1993.

Tchoryk Jr., P.; A. Hays, J. Pavlich, G. Ritter, G. Wassick, C. Nardell, G. Sypitkowski, "Autonomous Satellite Docking System," AIAA 2001-4527, AIAA Space 2001 Conference and Exhibition, Albuquerque, NM, Aug. 28-30, 2001.

Tchoryk Jr., P., A. Hays, J. Pavlich, "Modeling and Simulation of an Autonomous Satellite Docking System," AIAA 2001 Core Technologies for Space Systems Conference, Nov. 28-30, 2001, Colorado Springs, CO.

Tchoryk Jr., P.; Anthony B. Hays, Jane C. Pavlich; "A Docking Solution for On-Orbit Satellite Servicing: Part of the Responsive Space Equation," AIAA-LA Section/SSTC 2003-2001 Responsive Space Conference Apr. 1-3, 2003.

Hays, A. B.; P. Tchoryk, Jr., J. Pavlich, G. Wassick, "Dynamic Simulation and Validation of a Satellite Docking System," SPIE AeroSense Symposium, Space Systems Technology and Operations Conference, Orlando, FL, Apr. 21-25, 2003.

Pavlich, J.; P. Tchoryk, Jr., A. Hays, G. Wassick, "KC-135 Zero-G Testing of a Micro-Satellite Docking Mechanism," SPIE AeroSense Symposium, Space Systems Technology and Operations Conference, Orlando, FL, Apr. 21-25, 2003.

Hays, A., Dynamic Simulation Makes a Connection, Aerospace Engineering. SAE Engineering, SAE Publications, Nov. 2003, p. 77.

Hays, A. B.; P. Tchoryk, Jr., J. C. Pavlich, G. A. Ritter, G. J. Wassick; Advancements in KC-135 microgravity testing satellite docking system, Proceedings of SPIE, vol. 5419, Spacecraft Platforms and Infrastructure, Peter Tchoryk, Jr., Melissa Write, Editors, Aug. 2004, pp. 119-129.

Hays, A. B.; P. Tchoryk, Jr., J. C. Pavlich, Greg A. Ritter, Gregory J. Wassick; Advancements in design of an autonomous satellite docking system, Proceedings of SPIE, vol. 5419, Spacecraft Platforms and Infrastructure, Peter Tchoryk, Jr., Melissa Write, Editors, Aug. 2004, pp. 107-118.

USPTO Office Action in U.S. Appl. No. 10/907,091, May 2, 2008, 15 pages.

Ritter et al., Docking System, U.S. Appl. No. 12/409,468, filed Mar. 23, 2009, 53 pages.

USPTO Office Action in U.S. Appl. No. 11/531,261, Feb. 4, 2010, 16 pages.

USPTO Office Action in U.S. Appl. No. 12/409,456, Jun. 11, 2010, 15 pages.

Schedules and Lingering Worries, http://history.nasa.gov/SP-4205/ch12-2.html, 4 pages, Jun. 11, 2010 USPTO Office Action in U.S. Appl. No. 12/409,456.

* cited by examiner

DOCKING SYSTEM

CROSS-REFERENCE TO RELATED APPLICATIONS

The instant application is a continuation-in-part of U.S. application Ser. No. 10/907,091 filed on Mar. 18, 2005, which claims the benefit of prior U.S. Provisional Application Ser. No. 60/554,763 filed on Mar. 18, 2004. The instant application is also a continuation of U.S. application Ser. No. 12/263,498 filed on Nov. 2, 2008. Application Ser. No. 10/907,091 is being allowed to go abandoned. All of the above-identified applications are incorporated by reference herein in their entirety.

STATEMENT REGARDING FEDERALLY SPONSORED RESEARCH OR DEVELOPMENT

This invention was made with Government support under Contract Nos. DAAH01-00-C-R012 and DAAH01-01-C-R015 awarded by the U.S. Army Aviation and Missile Command, with funding from the Defense Advanced Research Projects Agency (DARPA); and with Government support under Contract No. F29601-02-C-0007 awarded by the U.S. Air Force. The Government has certain rights in this invention.

BRIEF DESCRIPTION OF THE DRAWINGS

FIG. 1b illustrates a view of a docking face of the chase vehicle illustrated in FIG. 1a;

FIG. 1c illustrates a view of a docking face of the target vehicle illustrated in FIG. 1a;

DESCRIPTION OF EMBODIMENT(S)

Figure 1A:
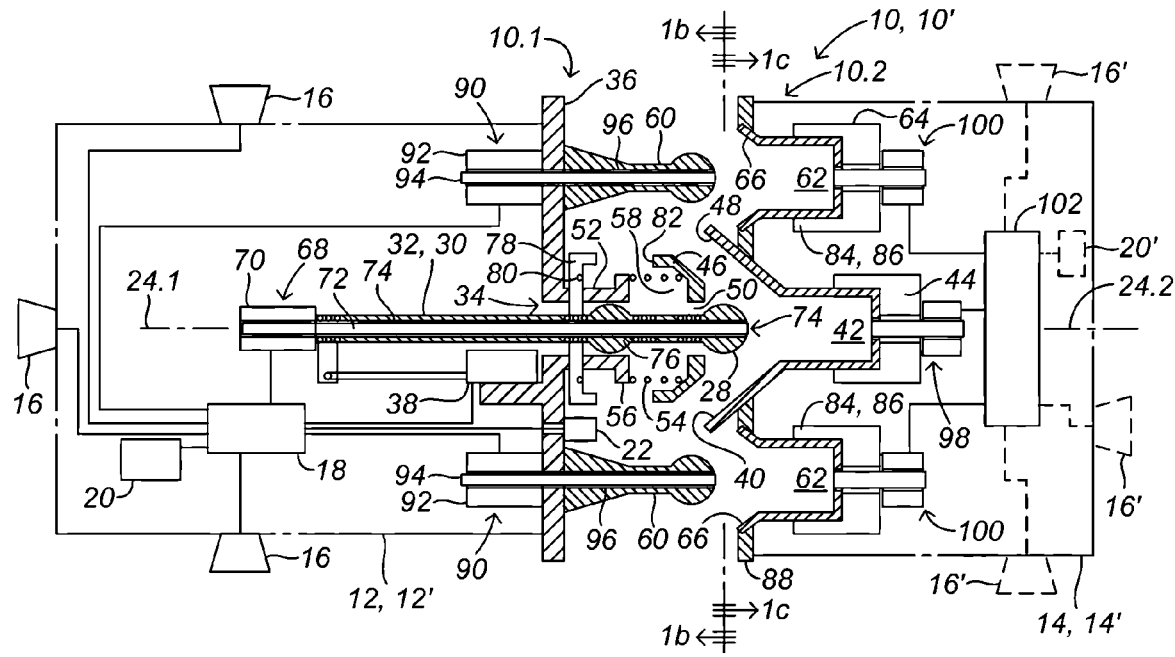
FIG. 1a illustrates a side view of chase and target vehicles on approach to, and in proximity with, one another prior to docking using an associated docking system.

Referring to FIG. 1a, a docking system 10, for example, an autonomous vehicle docking system 10', provides for docking a chase vehicle 12 to a target vehicle 14, wherein, for example, the chase vehicle 12 is adapted to perform the capture or servicing operations, and, for example, the target vehicle 14 is adapted to be captured or serviced. The chase 12 and target 14 vehicles, for example, spacecraft 12', 14' or underwater vehicles are illustrated in proximity to one another prior to docking. The chase 12 and target 14 vehicles are not limited to a particular type of vehicle, and, for example, could be underwater or surface aquatic vehicles, ground-based vehicles, spacecraft, or aircraft. During a docking operation, the chase 12 and target 14 vehicles become releasably coupled to one another so as to provide for transferring cargo, materials, energy (e.g. electrical or chemical/fuel), signals or people therebetween, for example, so as to provide for the chase vehicle 12 to either service the target vehicle 14, or to provide for the recovery of a payload from, or constituting, the target vehicle 14. In some cases, the target vehicle 14 may not be able to contribute any active control over the docking process, wherein all of the active elements associated with docking would be located in or on the chase vehicle 12, with corresponding passive elements, adapted to cooperate therewith, located in or on the target vehicle 14. For example, the chase vehicle 12—under active control, either autonomously, by man, or a combination thereof—might pursue the target vehicle 14 in preparation for docking, for example, using various thrusters 16 under control of a controller 18 responsive to or a part of an autonomous guidance, navigation and control system 20, for example, responsive to associated guidance or navigation sensors 22, so as to provide for maneuvering the chase vehicle 12 relative to the target vehicle 14 so as to sufficiently align the chase 12 and target vehicles 14 so that a docking operation may be initiated therebetween. Following initiation of a docking operation, the docking system 10 provides for auto-alignment of the chase 12 and target 14 vehicles, which is defined as a process of automatically aligning the chase 12 and target 14 vehicles during the docking operation without requiring separate active components or a separate alignment stage of the docking sequence.

The chase 12 and target 14 vehicles respectively incorporate first 10.1 and second 10.2 portions of the docking system 10, which are adapted to be releasably coupled to one another, the first portion 10.1 of which, also known as the chaser portion 10.1, is operatively coupled to or a part of the chase vehicle 12, and the second portion 10.1 of which, also known as the target portion 10.2, is operatively coupled to or a part of the target vehicle 14. Each of first 10.1 and second 10.2 portions of the docking system 10 respectively have respective first 24.1 and second 24.2 roll axes, wherein the first roll axis 24.1 constitutes a central axis of the active elements of the chaser portion 10.1 of the docking system 10 that act substantially therealong, and the second roll axis 24.2 constitutes a central axis of the associated passive elements of the target portion 10.2 of the docking system 10. The chase vehicle 12 can be maneuvered so as to provide for aligning the first roll axis 24.1 thereof sufficiently with the second roll axis 24.2 of the target vehicle 14 so as to enable docking to be initiated. Thereafter, during the associated docking process, the first 24.1 and second 24.2 roll axes become further aligned with one another as a result of the interaction of the first 10.1 and second 10.2 portions of a docking system 10.

Figure 1B:
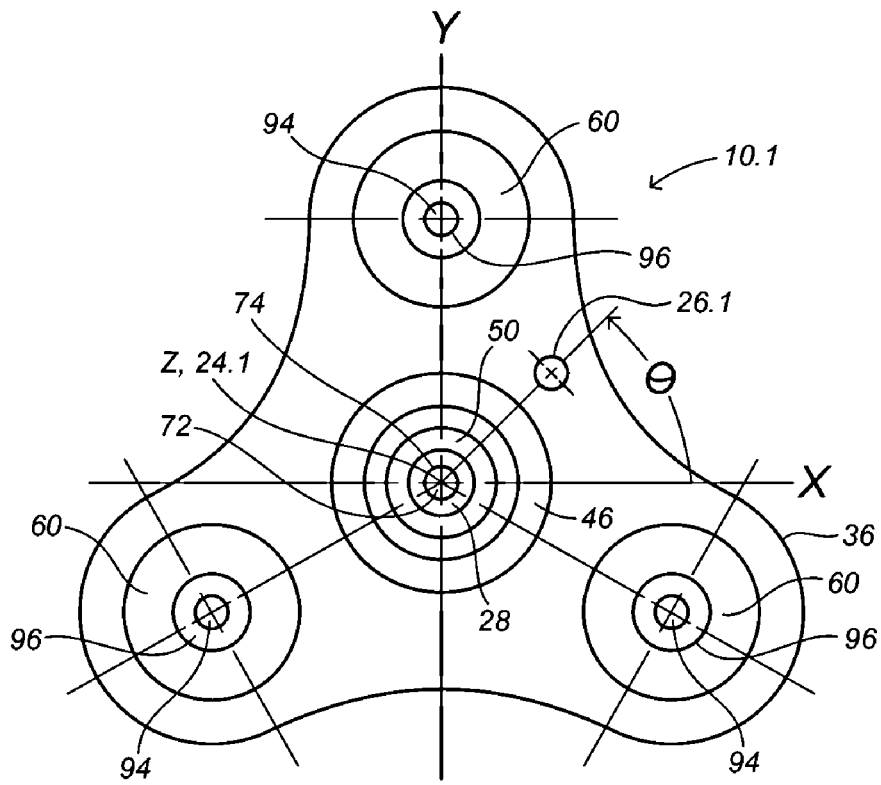
Figure 1C:
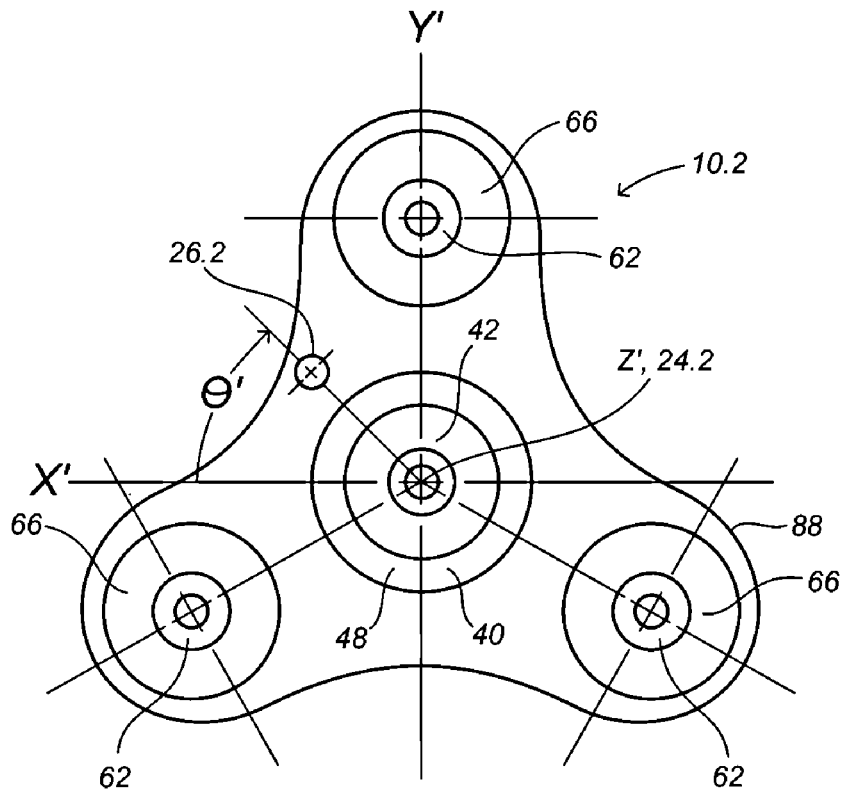

Referring also to FIGS. 1b and 1c, the chaser 10.1 and target 10.2 portions may be assigned respective Cartesian coordinate systems (X, Y, Z) and (X', Y' Z'), the Z and Z' axes of which are collinear with the first 24.1 and second 24.2 roll axes respectively. In addition to aligning the first 24.1 and second 24.2 roll axes during docking, it may also be necessary to provide for a rotational alignment ($\theta$, $\theta'$) of the chase 12 and target 14 vehicles relative to the first 24.1 and second 24.2 roll axes, for example, so as to provide for aligning material, fluid, electrical or information transfer devices or conduits 26.1, 26.2, or to provide for physically transferring payloads between the chase 12 and target 14 vehicles. Accordingly, during docking, the docking system 10 may, in general, provide for aligning the chase 12 and target 14 vehicles in both Cartesian (X, Y, Z) translation and in pitch, yaw and roll rotation relative to either of the first 24.1 and second 24.2 roll axes.

Each of the chase 12 and target 14 vehicles has an associated trajectory prior to docking, and in many cases, particularly for spacecraft 12', 14' operating in outer space, it is beneficial if the force of impact of one vehicle 12, 14, or portions thereof, upon the other vehicle 14, 12, is sufficiently small prior to coupling so as to not substantially perturb the trajectories of either the chase 12 or target 14 vehicles during the coupling process, so that the chase 12 and target 14 vehicles remain sufficiently aligned and proximate with respect to one another so as to enable completion of the docking process. Otherwise, the force of impact of the chase 12 and target 14 vehicles might cause the chase 12 and target 14 vehicles to be pushed away from one another by rebound prior to coupling.

Figure 2:
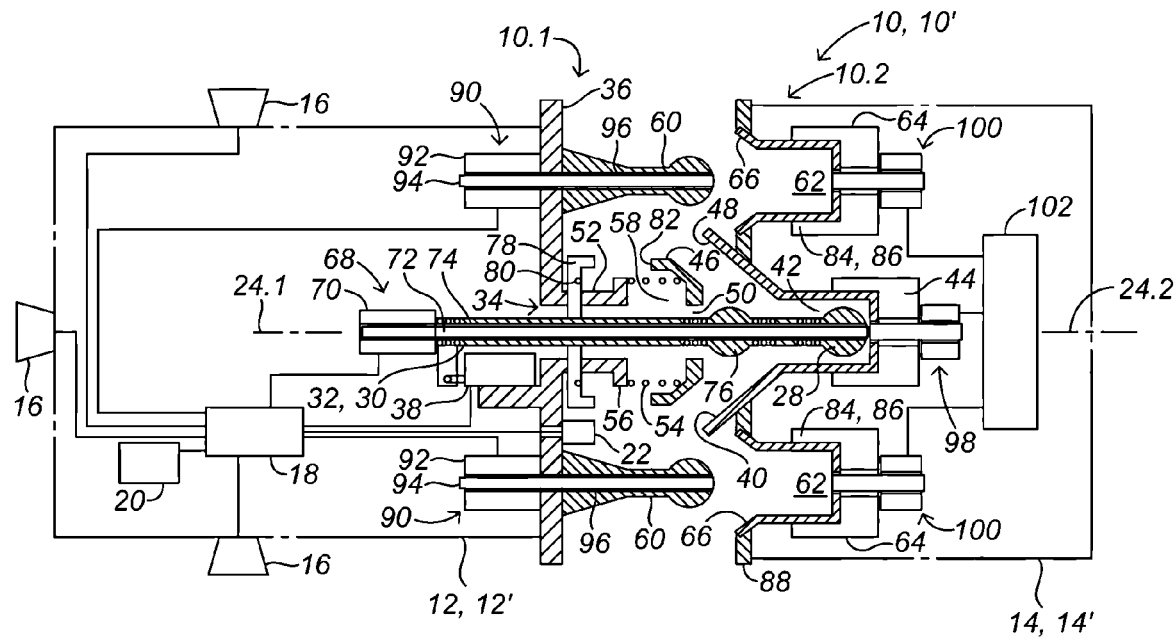
FIG. 2 illustrates the result of an associated soft-docking process.

Referring to FIG. 2, after an initial pursuit phase, with the chase vehicle 12 sufficiently close to the target vehicle 14 so as to provide for the initiation of docking therewith, the chase vehicle 12 commences what is referred to as a soft-docking process by extending a first coupling element 28 at the end of an extendable flexible tensile element 30 coupled to the chase vehicle 12. The extendable flexible tensile element 30 is adapted to support a tensile force therein, but is otherwise relatively compliant in bending so as to not transmit substantial shear forces, or moments from one end to the other. For example, in one set of embodiments, the extendable flexible tensile element 30 comprises a docking cable assembly 32 that can be extended from, or retracted into, a central opening 34 of an associated first support structure 36 of the chaser portion 10.1 of the docking system 10, for example, as provided for by an associated linear actuator 38 adapted to act between the docking cable assembly 32 and the first support structure 36, responsive to a signal from the controller 18.

The extendable flexible tensile element 30 and first coupling element 28 at the end thereof are extended from the chase vehicle 12 towards a central docking cone 40 that leads to an associated central capture socket 42 of the target vehicle 14, wherein the central docking cone 40 provides for guiding the first coupling element 28 into the central capture socket 42 if initially misaligned therewith. After insertion therein, the first coupling element 28 becomes captured within the central capture socket 42 by action of a central capture mechanism 44 associated with the central capture socket 42, so as to thereby mechanically couple the chase vehicle 12 to the target vehicle 14, resulting in what is referred to as a soft dock. Accordingly, during the soft-docking process, the chase vehicle 12 is able to capture the target vehicle 14 without either the chase 12 or target 14 vehicles imparting a substantial force to one another, as a result of the compliant nature of the extendable flexible tensile element 30 used to couple the chase 12 and target 14 vehicles together.

Figure 3:
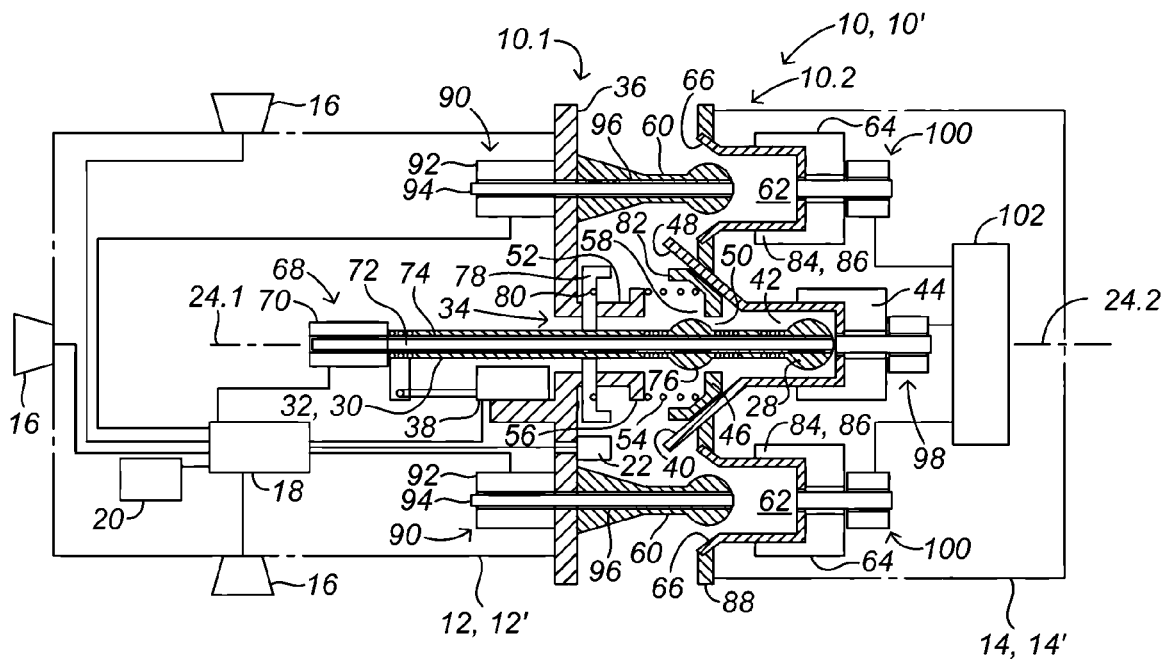
FIG. 3 illustrates the result of an associated hard-docking process.

Referring to FIG. 3, following the soft-docking process, the chase vehicle 12 establishes a relatively more rigid coupling between the chase 12 and target 14 vehicles by retracting the extendable flexible tensile element 30, thereby drawing the chase 12 and target 14 vehicles together until at least one relatively rigid portion of each abuts and presses against a corresponding at least one relatively rigid portion of the other, i.e. in what is referred to as a hard-docking process, resulting in what is referred to as a hard dock. When hard docked, the chase 12 and target 14 vehicles in combination kinematically substantially constitute a single combined body. As use herein, the term rigidity as applied to docking is intended to refer to a lack of flexure at the associated docking interface between the chase 12 and target 14 vehicles.

For example, in one embodiment, the chase vehicle 12 incorporates as its relatively rigid portion a hollow probe head 46 that is shaped, e.g. sloped or conically shaped, so as to provide for mating with an associated concave conical surface 48 of the central docking cone 40, wherein the extendable flexible tensile element 30 operates through a central bore 50 in the probe head 46. The probe head 46 is coaxial with, and spring-biased from, a hollow stub shaft 52 extending from the first support structure 36 of the chaser portion 10.1 of the docking system 10, through which the central opening 34 thereof extends. For example, a helical compression spring 54 coaxial with the hollow stub shaft 52 operates between a flange 56 on the hollow stub shaft 52 and a counterbore 58 within the probe head 46.

Accordingly, as the extendable flexible tensile element 30 is retracted through the central opening 34, the extendable flexible tensile element 30 pulls on the first coupling element 28 coupled to the central capture socket 42 of the target vehicle 14, bringing the chase 12 and target 14 vehicles together until the probe head 46 of the chase vehicle 12 becomes seated in the central docking cone 40 of the target vehicle 14, resulting in a hard dock of the chase 12 and target 14 vehicles, with the chase 12 and target 14 vehicles thereby connected together so as to kinematically become substantially a single combined body.

Figure 4:
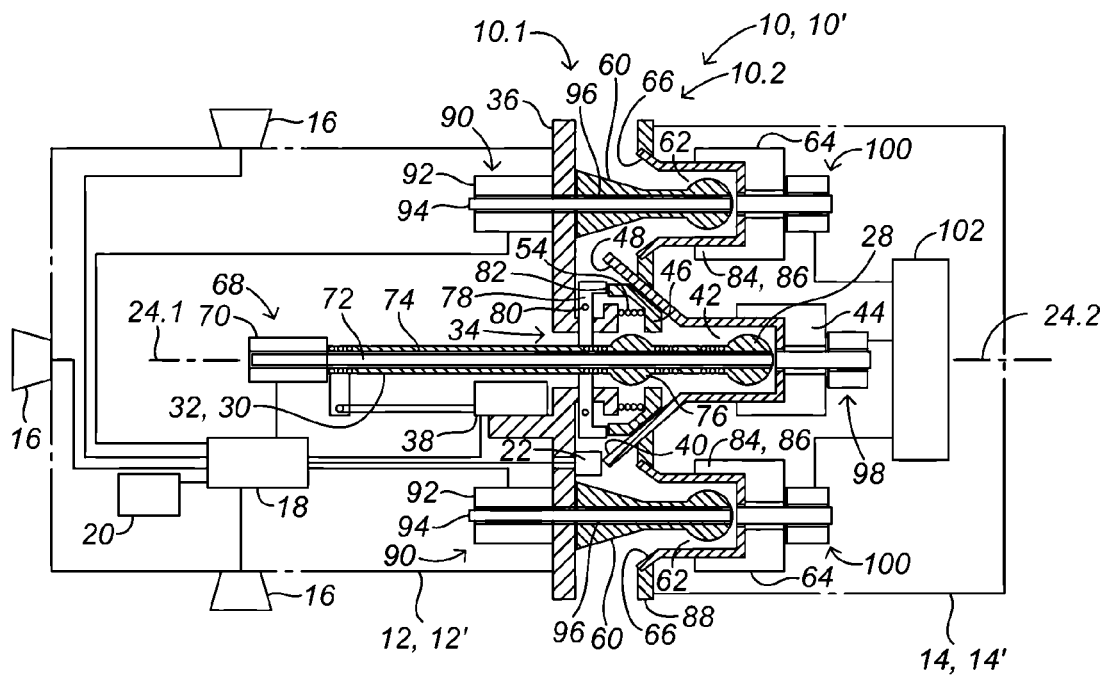
FIG. 4 illustrates the result of an associated initial phase of a rigidization process.

Referring to FIG. 4, following the hard-docking process, a rigidization process is then commenced, whereby the controller 18 signals the linear actuator 38 to further retract the extendable flexible tensile element 30 into the chase vehicle 12, thereby causing the probe head 46 to compress the helical compression spring 54, increasing the tension in the extendable flexible tensile element 30 and increasing the compressive force of the probe head 46 against the central docking cone 40, and bringing the chase 12 and target 14 vehicles further together until a plurality of distal auto-alignment load-bearing guideposts 60 distal to the probe head 46 of the chaser portion 10.1 of the docking system 10 engage a corresponding plurality of distal capture sockets 62 distal to the central capture socket 42 of the target portion 10.2 of the docking system 10, and trigger associated distal capture mechanisms 64 therein so as to cause the distal auto-alignment load-bearing guideposts 60 to become mechanically captured within the corresponding distal capture sockets 62, wherein the distal auto-alignment load-bearing guideposts 60 are guided into the corresponding distal capture sockets 62 by corresponding distal docking cones 66 associated with the distal capture sockets 62. In one embodiment, simultaneously, the transfer devices or conduits 26.1, 26.2 of the chase 12 and target 14 vehicles, if present, also engage or align with one another so as to provide for transfer of material, fluid, electrical power or information therebetween.

Figure 5:
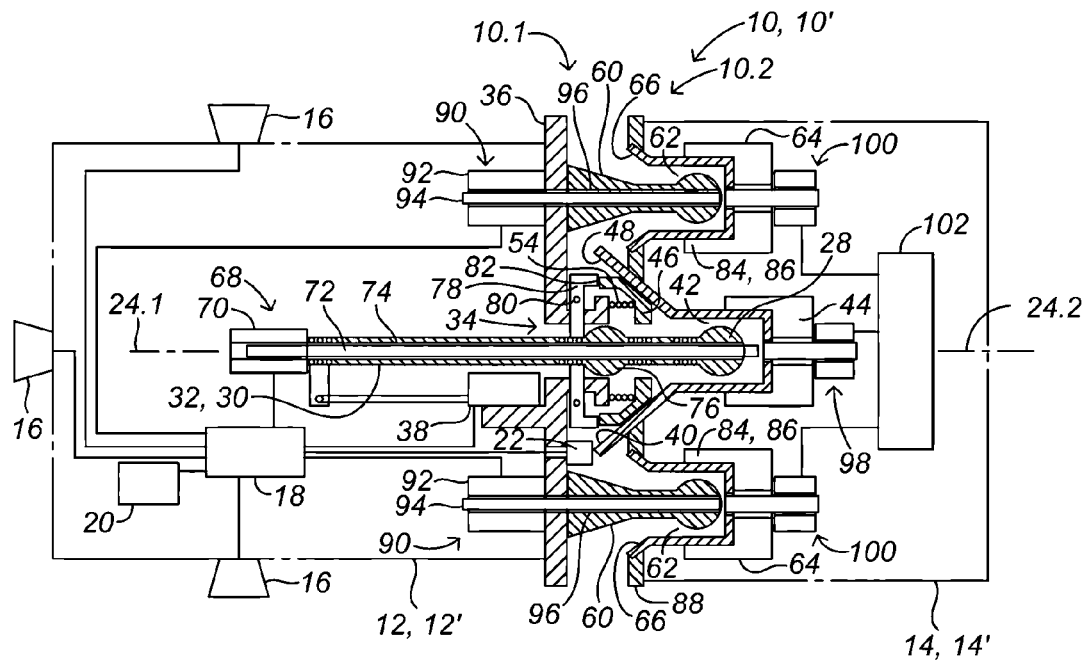
FIG. 5 illustrates the result of an associated final phase of the rigidization process.

Referring to FIG. 5, following capture of the distal auto-alignment load-bearing guideposts 60 within the distal capture sockets 62 by the distal capture mechanisms 64, the controller 18 then signals a primary central release mechanism 68 so as to cause the central capture mechanism 44 to release the first coupling element 28 from capture within the central capture socket 42. For example, in one set of embodiments the primary central release mechanism 68 comprises a release solenoid 70 that acts on a central push rod 72 that extends through a central bore 74 in the extendable flexible tensile element 30, and which acts upon the central capture mechanism 44 so as to cause the release of the first coupling element 28 thereby. The controller 18 then signals the linear actuator 38 to partially retract the extendable flexible tensile element 30 back into the chase vehicle 12, thereby partially withdrawing the first coupling element 28 from the central capture socket 42, and simultaneously retracting a linearly-actuated cam element 76 towards the first support structure 36 of the chaser portion 10.1 of the docking system 10, wherein the linearly-actuated cam element 76 is attached to the extendable flexible tensile element 30 at a relatively central location along the extendable flexible tensile element 30 relative to the first coupling element 28. The extendable flexible tensile element 30 is retracted until the linearly-actuated cam element 76 engages a plurality of rotary cam followers 78, each of which is hinged about a corresponding pivot 80 that depends from the first support structure 36, thereby causing the rotary cam followers 78 to rotate and engage an aft edge 82 of the probe head 46, thereby further compressing the probe head 46 against the central docking cone 40 and generating an aftwardly-directed force on the first support structure 36 through the pivots 80, which acts to separate the chaser 10.1 and target 10.2 portions of the docking system 10 from one another, which are otherwise maintained in engagement by the action of the distal auto-alignment load-bearing guideposts 60 captured within the associated distal capture sockets 62 against the corresponding aft portions 84 of the associated corresponding distal capture mechanisms 64.

For example, in one set of embodiments, there are a plurality of three distal auto-alignment load-bearing guideposts 60 and corresponding distal capture sockets 62 arranged in a triangular pattern around, and proximate to the periphery of, the first 10.1 and second 10.2 portions of the docking system 10, which provides for three sets of contact surfaces 86 on the associated aft portions 84 of the corresponding distal capture mechanisms 64 where the first 10.1 and second 10.2 portions of the docking system 10 abut one another, wherein upon a rigidization of the docking system 10 caused by the aftwardly-directed force on the distal auto-alignment load-bearing guideposts 60 from the first support structure 36 of the chaser portion 10.1 of the docking system 10 reacting against a forwardly-directed force on the distal capture mechanisms 64 from a second support structure 88 of the target portion 10.1 of the docking system 10, caused by the compressive force of the probe head 46 acting upon the central docking cone 40 and as a result, acting upon the second support structure 88 from which the central docking cone 40 and the associated distal capture sockets 62 and distal capture mechanisms 64 depend. The contact surfaces 86 are adapted to prevent relative translation and rotation of the first 10.1 and second 10.2 portions of the docking system 10 relative to one another, thereby further stabilizing the coupling of the chase 12 and target 14 vehicles. Furthermore, the compressive force holding the distal auto-alignment load-bearing guideposts 60 against the associated contact surfaces 86 of the distal capture mechanisms 64, being distal relative to the first 24.1 and second 24.2 roll axes, provides for rigidizing the coupling between the chase 12 and target 14 vehicles. In another embodiment, following the rigidization of the docking system 10, the transfer devices or conduits 26.1, 26.2 of the chase 12 and target 14 vehicles, if present, engage or align with one another so as to provide for transfer of material, fluid, electrical power or information therebetween.

Figure 6:
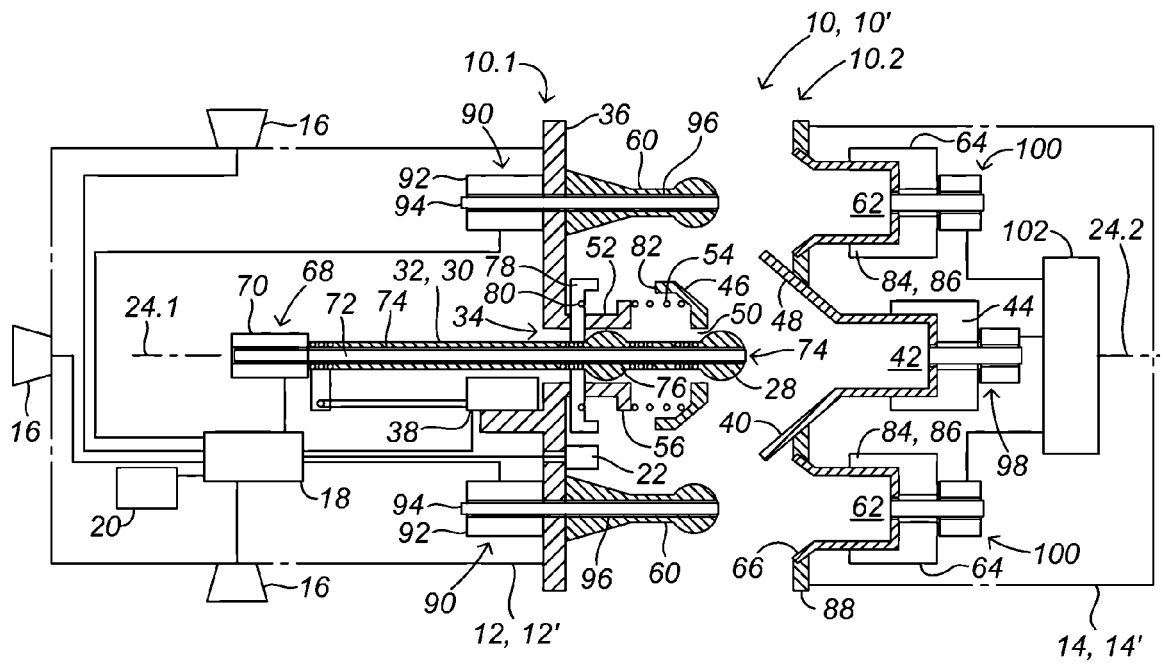
FIG. 6 illustrates the result of an associated undocking process.

Referring to FIG. 6, the process of undocking the chase 12 and target 14 vehicles commences with the controller 18 signaling primary distal release mechanisms 90 associated with each of the distal capture mechanisms 64 so as to cause the associated distal capture mechanisms 64 to release the corresponding associated distal auto-alignment load-bearing guideposts 60 from capture within the corresponding distal capture sockets 62, thereby relieving the rigidization forces acting between the distal auto-alignment load-bearing guideposts 60 and the contact surfaces 86 of the distal capture mechanisms 64, thereby enabling the compressive force of the probe head 46 acting upon the central docking cone 40—caused by the compressed helical compression spring 54—to separate the chaser 10.1 and target 10.2 portions of the docking system 10 from one another, thereby undocking the target vehicle 14 from the chase vehicle 12. For example, in one set of embodiments the primary distal release mechanisms 90 comprise a release solenoids 92 that act upon corresponding central push rods 94 that extend through corresponding associated central bores 96 in each of the corresponding associated distal auto-alignment load-bearing guideposts 60, and which act upon the corresponding associated distal capture mechanisms 64 so as to cause the release of the distal auto-alignment load-bearing guideposts 60 thereby. If the thrusters 16 on the chase vehicle 12 are simultaneously activated so as to generate a thrust away from the target vehicle 14 with a magnitude greater than or equal to the rigidization force, then the undocking process would not impart a substantial force upon the target vehicle 14, and would leave the target vehicle 14, if in a substantially zero gravity field, substantially unperturbed relative to its position prior to undocking.

The target vehicle 14 incorporates a secondary central release mechanism 98 associated with the central capture mechanism 44, and incorporates secondary distal release mechanisms 100 associated with each of the distal capture mechanisms 64, so as to provide for independently releasing the central capture mechanism 44 or the distal capture mechanisms 64, for example, responsive to a signal or signals from a separate controller 102 in the target vehicle 14, for example, in the event of a failure of the primary central release mechanism 68 to release the central capture mechanism 44, or any of the primary distal release mechanisms 90 to release the corresponding distal capture mechanisms 64.

Although the distal auto-alignment load-bearing guideposts 60 have been illustrated in association with the chaser portion 10.1 of the docking system 10, and the corresponding distal capture sockets 62 have been illustrated in association with the target portion 10.2 of the docking system 10, it should be understood that the distal auto-alignment load-bearing guideposts 60 could also be associated with the target portion 10.2 of the docking system 10, or some of the distal auto-alignment load-bearing guideposts 60 could be associated with, e.g. located on, the chaser portion 10.1 of the docking system 10, and the remaining distal auto-alignment load-bearing guideposts 60 could be associated with, e.g. located on, the target portion 10.2 of the docking system 10, wherein for a particular distal auto-alignment load-bearing guideposts 60 associated with, e.g. located on, one of the chaser 10.1 and target 10.2 portions of the docking system 10, the corresponding distal capture sockets 62 would be associated with, e.g. located on, the other of the target 10.2 and chaser 10.1 portions of the docking system 10.

Referring to FIGS. 7a through 21, there is illustrated a physical embodiment of a docking system 10 that provides for the functionality described hereinabove, various details of which will now be described in greater detail.

Figure 7A:
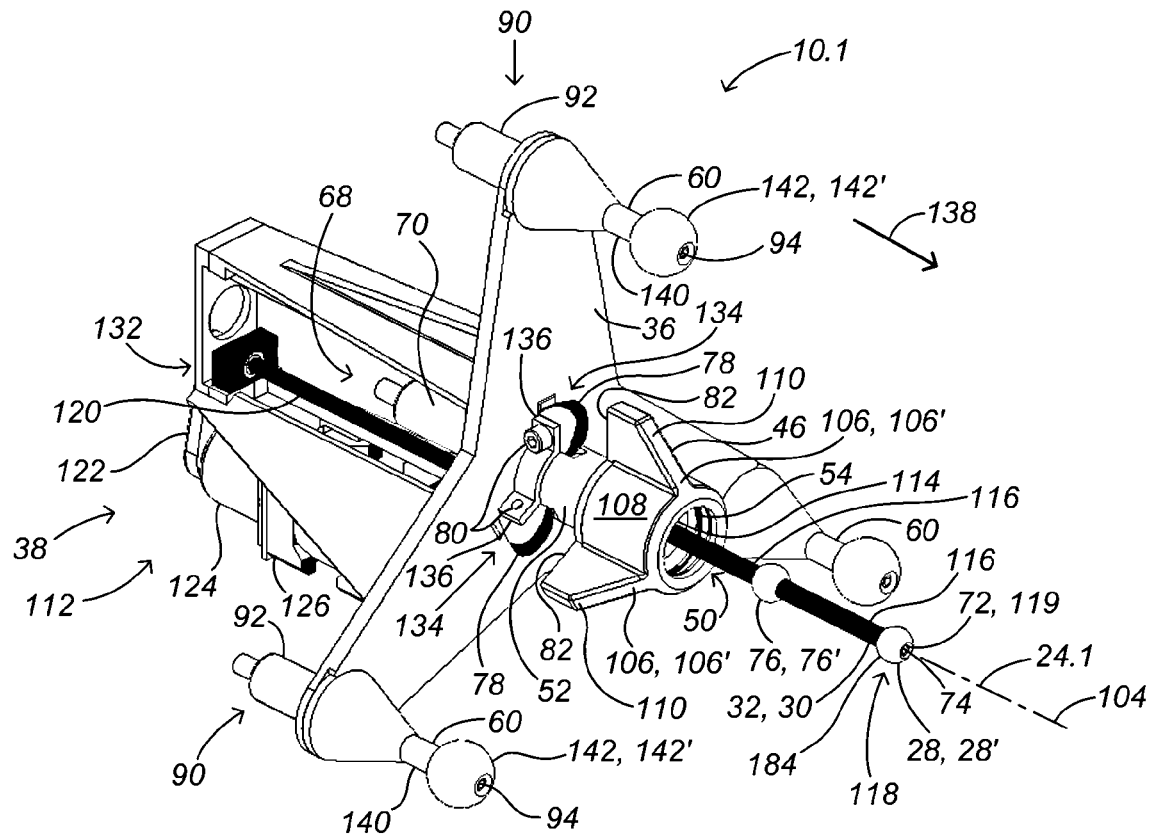
FIG. 7a illustrates first isometric view of a chaser portion of a docking system, from the perspective of the docking side thereof.
Figure 7B:
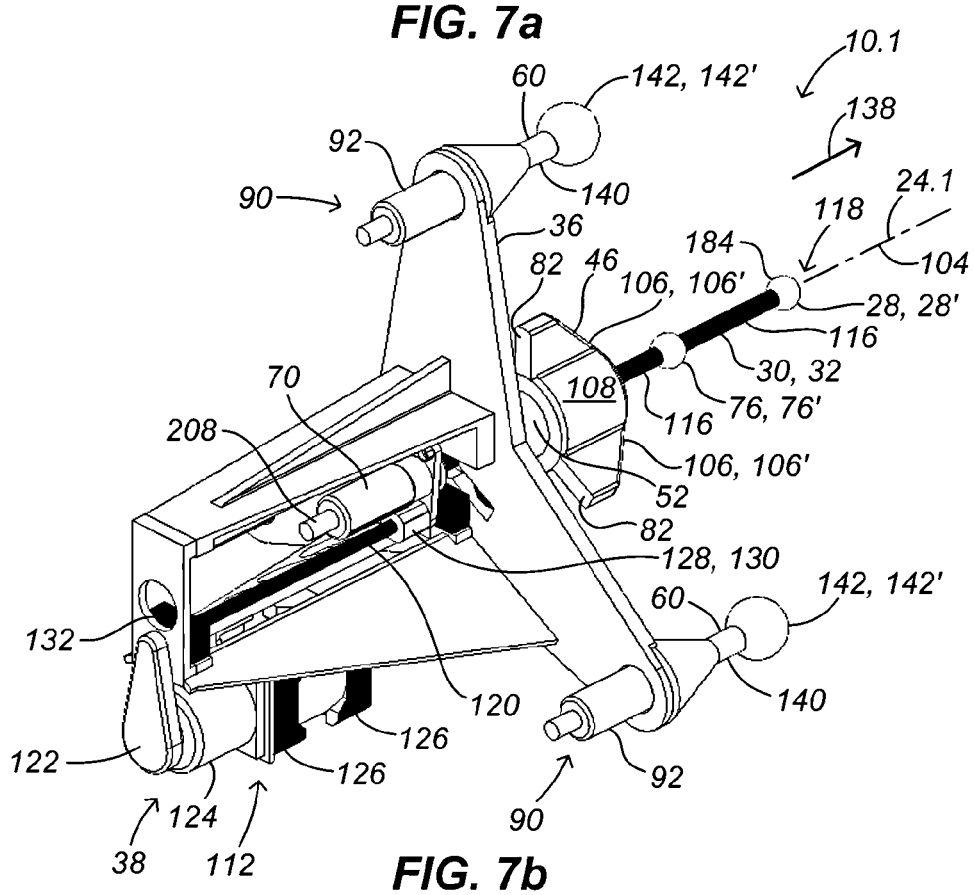
FIG. 7b illustrates second isometric view of the chaser portion of the docking system, from the perspective of the vehicle side thereof.

Referring to FIGS. 7a and 7b, a first support structure 36 of the chaser portion 10.1 of the docking system 10 supports an extendable flexible tensile element 30 adapted to operate along a central docking axis 104 for soft docking, supports a centrally-located spring-loaded probe head 46 adapted to operate thereabout along the central docking axis 104 for hard docking, and supports three distal auto-alignment load-bearing guideposts 60 distally distributed about the central docking axis 104 for docking rigidization, wherein the central docking axis 104 is collinear with an associated first roll axis 24.1 of the chaser portion 10.1 of the docking system 10.

The probe head 46 is adapted to slide along the central docking axis 104 over a hollow stub shaft 52 extending from the first support structure 36. The probe head 46 is biased away from the first support structure 36 along the hollow stub shaft 52 by a helical compression spring 54 operative therebetween, so as to provide for compliance between the chaser 10.1 and target 10.2 portions of the docking system 10, so as to provide for absorbing docking-induced forces imparted by a collision of associated parts during a docking operation, for example, during the hard-dock phase of a docking operation. The helical compression spring 54 also provides for imparting a small push-off force during an undocking operation to aid in separating the chase 12 and target 14 vehicles. The probe head 46 is shaped so as to provide for mating with an associated concave conical surface 48 of a central docking cone 40 of an associated target portion 10.2 of the docking system 10. For example, in one embodiment, a forward surface 106 of the probe head 46 comprises at least a portion of a convex conical boundary. For example, in the embodiment illustrated in FIGS. 7a and 7b, the probe head 46 comprises a central hub 108 with three radial fin-like protrusions 110 therefrom, each of which has an oblique forward surface 106' that is sloped so as to conform to the corresponding slope of an associated central docking cone 40 of an associated target portion 10.2 of the docking system 10. The probe head 46 is constructed of a relatively rigid, tough material, such as metal.

The extendable flexible tensile element 30 extends from an associated linear positioning and tensioning system 112 passes through a central opening 34 in the first support structure 36, through a central bore 114 in the hollow stub shaft 52, and through a central bore 50 in the probe head 46. For example, the extendable flexible tensile element 30 comprises a docking cable assembly 32 comprising a cable sheath 116 surrounding a central bore 74, wherein, a forward end 118 of the docking cable assembly 32 incorporates a first coupling element 28, for example, a spherical ball first coupling element 28' attached thereto, wherein the central bore 74 of the docking cable assembly 32 extends through the spherical ball first coupling element 28'. The spherical ball first coupling element 28' is constructed of a relatively rigid, tough material, such as metal, and is adapted to be received by a central capture socket 42 of the associated target portion 10.2 of the docking system 10, and to be captured during an associated soft-docking process by an associated central capture mechanism 44 associated therewith. A central push rod 72 located within the central bore 74 of the docking cable assembly 32 is operatively coupled to an associated release solenoid 70 that provides for sliding the central push rod 72 within the central bore 74, and providing for releasing the associated central capture mechanism 44 by pushing with a forward end 119 of the central push rod 72 thereagainst. Alternatively, the release solenoid 70 could be substituted with some other type linear actuator, for example, a motor-driven screw mechanism, or a motor- or rotary-solenoid-driven rack-and-pinion mechanism. The docking cable assembly 32 is adapted to support a tensile force therein, but is otherwise relatively compliant in bending so as to not transmit substantial shear forces, or moments from one end to the other.

The linear positioning and tensioning system 112, for example, comprises a linear actuator 38 operative in the chaser portion 10.1 of the docking system 10 between the first support structure 36 and the docking cable assembly 32 thereof. For example, in one embodiment, the linear positioning and tensioning system 112 and linear actuator 38 comprise a ball lead-screw 120 driven, for example, through a belt-drive system 122, by a motor 124 supported from a set of brackets 126 attached to the first support structure 36 of the chaser portion 10.1 of the docking system 10. A shuttle 128 incorporates a ball nut 130 that engages the ball lead-screw 120, the latter of which is supported from the first support structure 36 by at least one thrust bearing 132, so as to provide for translating the shuttle 128 relative to the first support structure 36 responsive to a rotation of the ball lead-screw 120 by the motor 124, responsive to a signal from an associated controller 18. The docking cable assembly 32 and associated release solenoid 70 are operatively coupled to the shuttle 128 so as to translate therewith. Accordingly, the linear positioning and tensioning system 112 provides for either extending or retracting the docking cable assembly 32 and associated release solenoid 70 from or into the chaser portion 10.1 of the docking system 10 responsive to a signal from the controller 18.

A plurality of rotary cam followers 78 of an associated cam-actuated loading mechanism 134 are supported on associated pivots 80 depend from the first support structure 36, or from brackets 136 operatively coupled thereto. The rotary cam followers 78 are driven by an associated linearly-actuated cam element 76, for example, a spherical linearly-actuated cam element 76', for example, constructed of metal, on the docking cable assembly 32 responsive to a linear retraction of the docking cable assembly 32 into the chaser portion 10.1 of the docking system 10 by the linear positioning and tensioning system 112. The rotary cam followers 78 are rotated responsive to a linear translation of the spherical linearly-actuated cam element 76' thereunder engaged therewith, and as a result, ride against an aft edge 82 of the probe head 46 so as to provide for driving the probe head 46 in a forward direction 138 responsive to a retraction of the docking cable assembly 32 by the linear positioning and tensioning system 112. For example, in one embodiment, there are a plurality of three rotary cam followers 78 equi-angularly spaced around the central docking axis 104, which provide for a balanced loading of the spherical linearly-actuated cam element 76' by the rotary cam followers 78 as the spherical linearly-actuated cam element 76' is actuated, wherein each rotary cam follower 78 is adapted to cooperate with the aft edge 82 of a different radial fin-like protrusion 110 of the associated probe head 46.

Each of the distal auto-alignment load-bearing guideposts 60 extending from the first support structure 36 comprises a rigid post 140, for example, constructed of metal, and adapted with an associated second coupling element 142, for example, a spherical end 142', at the forward end 144 thereof, and which incorporates a central bore 96 that extends through the post 140 and the spherical end 140. Each spherical end 142' of the distal auto-alignment load-bearing guideposts 60 is adapted to cooperate with any of the distal capture sockets 62 and associated distal capture mechanisms 64 of the target portion 10.2 of the docking system 10 so as to be capturable thereby. A central push rod 94 within the central bore 96 is adapted to be actuated by an associated release solenoid 92, so as to provide for releasing the associated distal capture mechanism 64 following capture of the associated distal auto-alignment load-bearing guidepost 60 thereby.

Figure 8A:
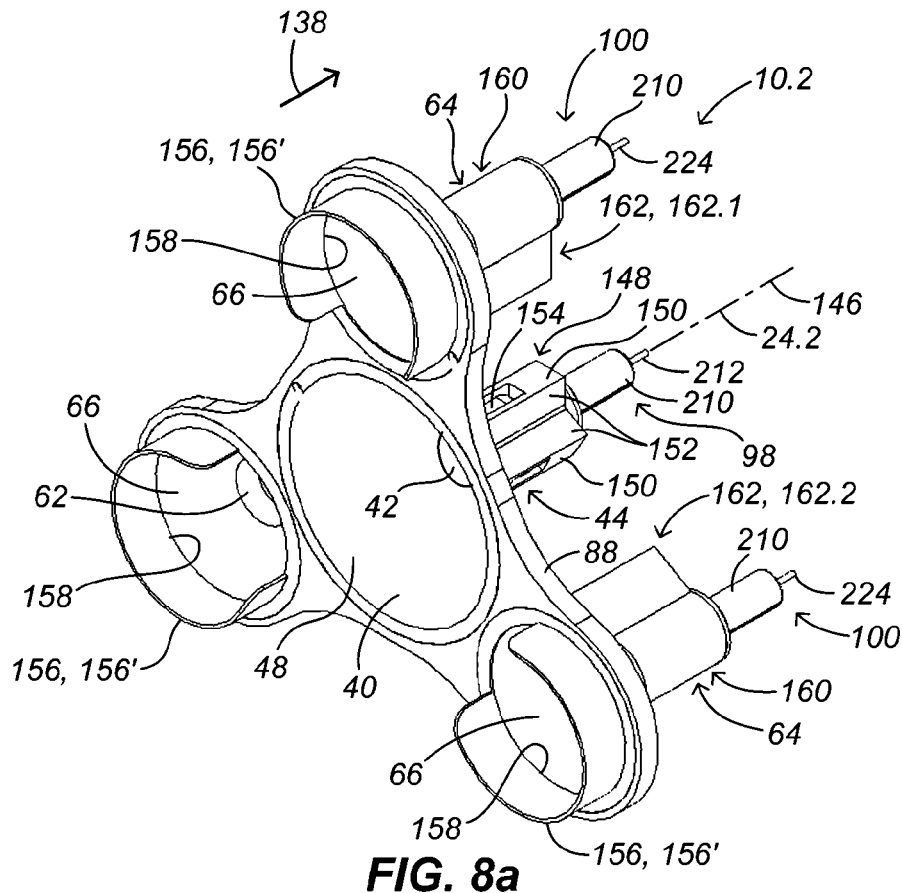
FIG. 8a illustrates first isometric view of a target portion of the docking system, from the perspective of the docking side thereof.
Figure 8B:
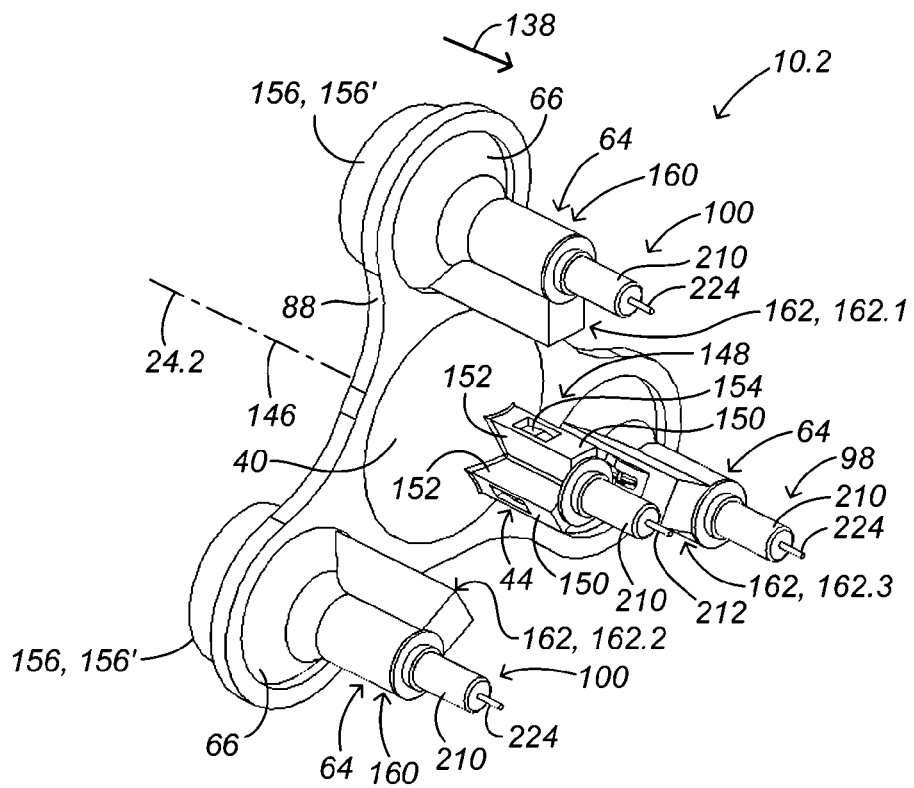
FIG. 8b illustrates second isometric view of the target portion of the docking system, from the perspective of the vehicle side thereof.
Figure 9:
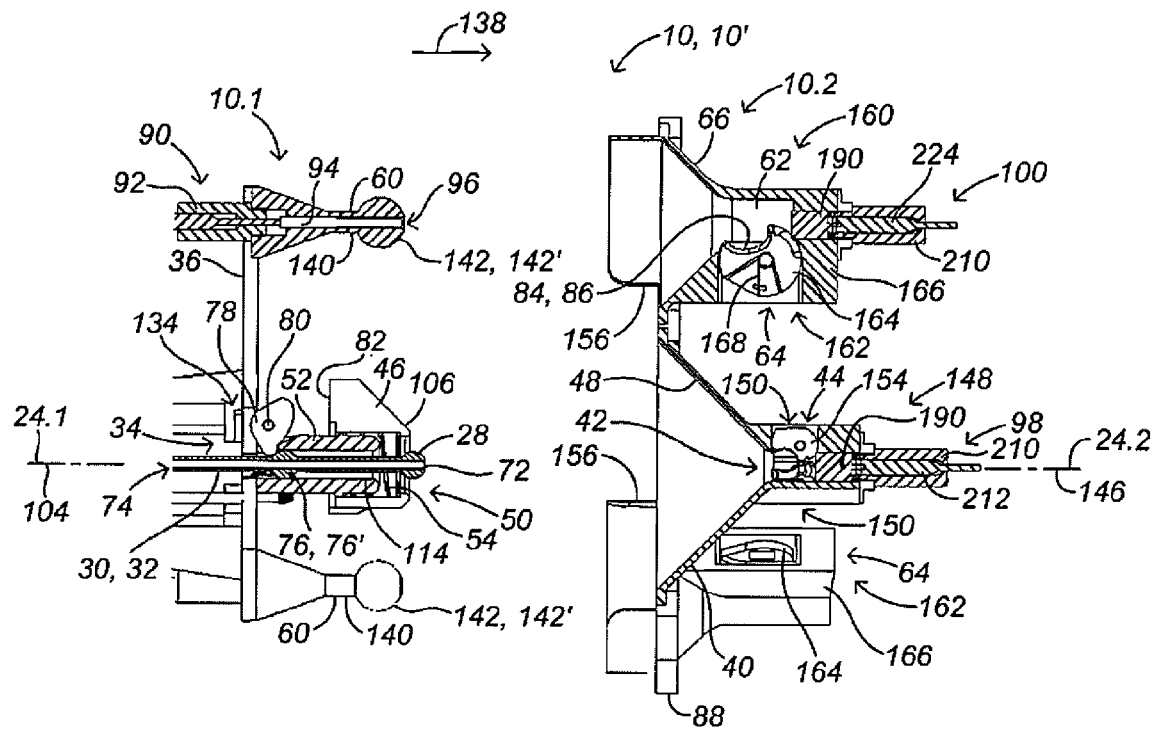
FIG. 9 illustrates a side view of chaser and target portions of the docking system on approach to, and in proximity with, one another prior to docking.

Referring to FIGS. 8a, 8b and 9, a second support structure 88 of the target portion 10.2 of the docking system 10 supports a central docking cone 40 and an associated central capture socket 42 and central capture mechanism 44, each aligned with an associated central docking axis 146, adapted to cooperate respectively with the probe head 46 and the first coupling element 28 of the docking cable assembly 32; and supports three distal docking cones 66 and associated distal capture sockets 62 and distal capture mechanisms 64 adapted to cooperate with the corresponding three distal auto-alignment load-bearing guideposts 60.

The central docking cone 40 provides for guiding the first coupling element 28 of the docking cable assembly 32 into the central capture socket 42 during the soft-docking process, and for then aligning with the probe head 46 during a subsequent hard-docking process. The central docking cone 40 can be made as wide or as narrow as necessary to capture the first coupling element 28 as it is extended outward from the chaser portion 10.1 of the docking system 10, depending upon the initial positioning accuracy of the associated autonomous guidance, navigation and control system 20.

The central docking cone 40 leads continuously into the associated central capture socket 42 that, together with the associated central capture mechanism 44, provides for capturing the first coupling element 28, e.g. the spherical ball first coupling element 28', of the docking cable assembly 32 at the culmination of the soft-docking process. For example, if the chase 12 and target 14 vehicles are initially misaligned at the commencement of docking, then during the initial soft-docking process, the first coupling element 28 will initially contact the surface of the central docking cone 40, and then be guided thereby along the surface thereof into the associated central capture socket 42. For example, in one embodiment, the central capture mechanism 44 comprises a three-pronged central trigger latch mechanism 148 comprising three corresponding associated central latch assemblies 150, each operative within a corresponding associated latch assembly housing 152. The central latch assemblies 150 are each spring-biased in an open state so as to provide for the spherical ball first coupling element 28' to fully enter the associated central capture socket 42. Following entry of the spherical ball first coupling element 28' into the central capture socket 42, the spherical ball first coupling element 28' depress and rotate the latch levers 154 of the associated central latch assemblies 150, which when sufficiently rotated become latched into a closed state so as to provide for capturing the spherical ball first coupling element 28' within the central capture socket 42.

In order to unlatch the central capture mechanism 44—and as a result, release the first coupling element 28 therefrom—the central push rod 72 is actuated by the release solenoid 70 associated therewith in the chaser portion 10.1 of the docking system 10. As a backup, the target portion 10.2 of the docking system 10 incorporates a secondary central release mechanism 98 in order to also provide of unlatching the central capture mechanism 44 in the event of a failure of the central capture mechanism 44 to be released by the release solenoid 70 acting on the central push rod 72 in the chaser portion 10.1 of the docking system 10.

The three distal docking cones 66 and associated distal capture sockets 62 and distal capture mechanisms 64 provide for aligning and capturing the distal auto-alignment load-bearing guideposts 60 during the hard-docking process, and the distal capture mechanisms 64 subsequently provide for docking rigidization during a subsequent rigidization process. An anti-roll shield 156, for example, comprising a metal collar 156', extends aftward from the entrance opening 158 of each distal docking cone 66, and provides a physical boundary to the lateral motion of the distal auto-alignment load-bearing guideposts 60 during docking, so as to limit any relative roll of the chaser 10.1 and target 10.2 portions of the docking system 10 to be within the capture boundaries of the docking system 10. The three distal docking cones 66 provide for coarsely aligning—by a combination of roll, pitch and yaw rotations about the Z, X and Y axes, respectively, towards and alignment of the central docking axes 104, 146 of the chaser 10.1 and target 10.2 portions of the docking system 10—the distal auto-alignment load-bearing guideposts 60 with the associated distal capture sockets 62 as the chaser 10.1 and target 10.2 portions of the docking system 10 are brought together—either during the soft-docking process by the retraction of the docking cable assembly 32 into the chaser portion 10.1 of the docking system 10, or directly by action of the autonomous guidance, navigation and control system 20 and associated thrusters 16 of the chase vehicle 12, absent an associated soft-docking process—responsive to the interaction of the spherical ends 142 of the distal auto-alignment load-bearing guideposts 60 sliding against the distal docking cones 66, guided by the distal docking cone 66 towards the apexes thereof and subsequent entry into the distal capture sockets 62.

The distal capture sockets 62 provide for a fine control of alignment of the distal auto-alignment load-bearing guideposts 60 after the distal auto-alignment load-bearing guideposts 60 are guided thereinto by the associated distal docking cones 66. Each distal capture socket 62 incorporates, at the forward end 160 thereof, an associated distal capture mechanism 64 comprising a distal latch assembly 162 that incorporates an associated latch lever 164 operative within an associated latch assembly housing 166. Each distal latch assembly 162 is normally in an unlatched state, but becomes latched when an associated distal auto-alignment load-bearing guidepost 60 depresses and trips the associated latch lever 164 thereof, so as to provide for capturing the distal auto-alignment load-bearing guidepost 60 within the associated distal capture socket 62.

FIGS. 9-21 illustrate the operation and further details of the docking system 10.

Referring to FIG. 9, the chaser 10.1 and target 10.2 portions of the docking system 10 are illustrated in proximity to one another, with the associated chase vehicle 12 approaching the target vehicle 14, wherein the chase vehicle 12 is positioned under control of an associated autonomous guidance, navigation and control system 20 that controls associated thrusters 16, for example, as illustrated in FIG. 1. Alternatively, or additionally, the target vehicle 14 could be positioned under control of a similar autonomous guidance, navigation and control system 20' that control associated thrusters 16'. The docking cable assembly 32 is retracted in a stowed position within the chaser portion 10.1 of the docking system 10, wherein the spherical linearly-actuated cam element 76' is bottomed out against the rotary cam followers 78. The probe head 46 is biased by the associated helical compression spring 54 in a forward direction 138 relative to the hollow stub shaft 52. The latch levers 154, 164 in the central 150 and distal 162 latch assemblies are rotationally biased in an open position by associated helical torsion springs 168 that act between a pin 170 depending from the associated latch assembly housing 152, 166 associated with each latch lever 154, 164, and an edge 172 of a recess 174 on a side of the latch lever 154, 164, wherein each latch lever 154, 164 is adapted to rotate about a pivot 176 depending from the latch assembly housing 152, 166, and one shaped quadrant 178 of each latch lever 154, 164 is shaped in cooperation with the associated central 42 and distal 62 capture sockets so as to provide for receiving the associated spherical ball first coupling element 28' of the docking cable assembly 32, and the associated spherical end 142' of the distal auto-alignment load-bearing guideposts 60, respectively, when the latch lever 154, 164 is in an open position; and so as to provide for capturing the associated spherical ball first coupling element 28' of the docking cable assembly 32, and the associated spherical end 142' of the distal auto-alignment load-bearing guideposts 60, respectively, when the latch lever 154, 164 is in a closed position, as will be described in greater detail hereinbelow in conjunction with FIGS. 13a-d and 14a-c. FIG. 9 illustrates both the chaser 10.1 and target 10.2 portions of the docking system 10 in a passive, quiescent state in preparation for docking, with no power being required thereby to maintain the associated components in this condition.

Figure 10:
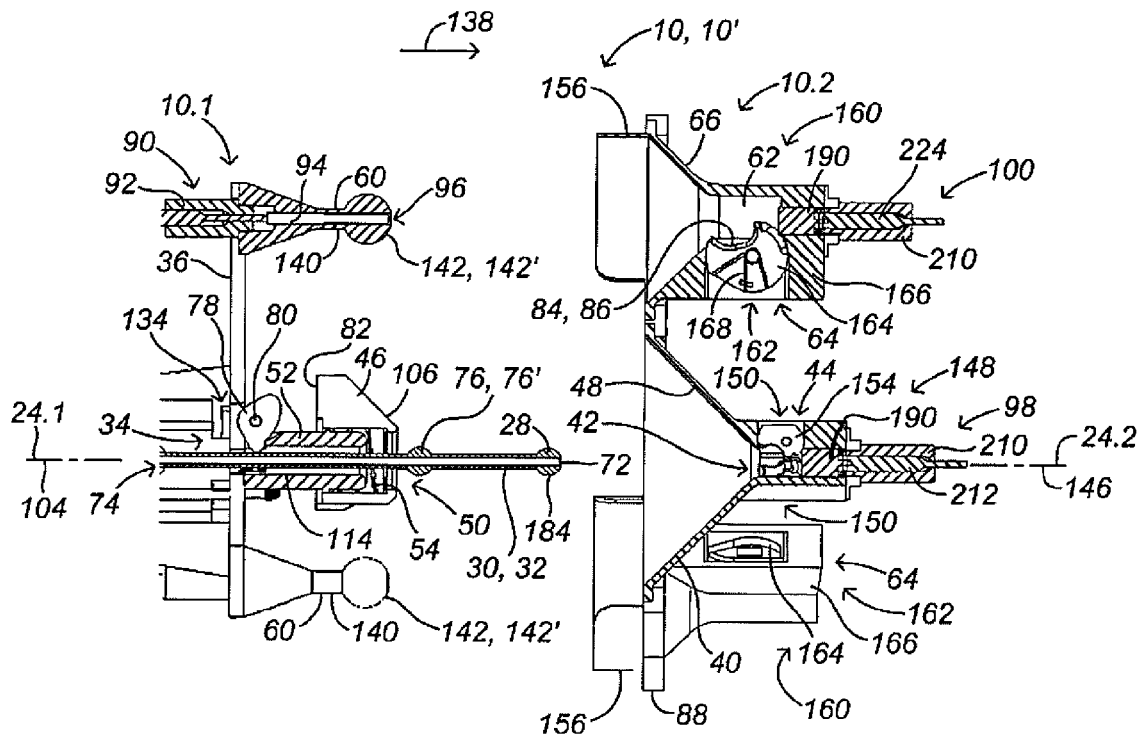
FIG. 10 illustrates an extension of a docking cable assembly from the chaser portion of the docking system at the commencement of an associated soft-docking process.

Referring to FIG. 10, after the chase 12 and target 14 vehicles have been sufficiently closely aligned so as to enable docking—i.e. so that the docking cable assembly 32, when extended from the chase vehicle 12, will engage the central docking cone 40 of the target vehicle 14; and so that when the chase 12 and target 14 vehicles are drawn together by the docking cable assembly 32, the distal auto-alignment load-bearing guideposts 60 of the chase vehicle 12 will engage corresponding distal docking cones 66 of the target vehicle 14—then the linear actuator 38 is actuated to extend the docking cable assembly 32 from the chaser portion 10.1 of the docking system 10 towards the central docking cone 40 of the target vehicle 14. More particularly, the associated motor 124 rotates the ball lead-screw 120 through the associated belt-drive system 122, and causing the associated ball nut 130 and shuttle 128 attached thereto to translate along the ball lead-screw 120, causing the docking cable assembly 32 attached to the shuttle 128 to extend in a forward direction 138 from the chaser portion 10.1 of the docking system 10.

Figure 11:
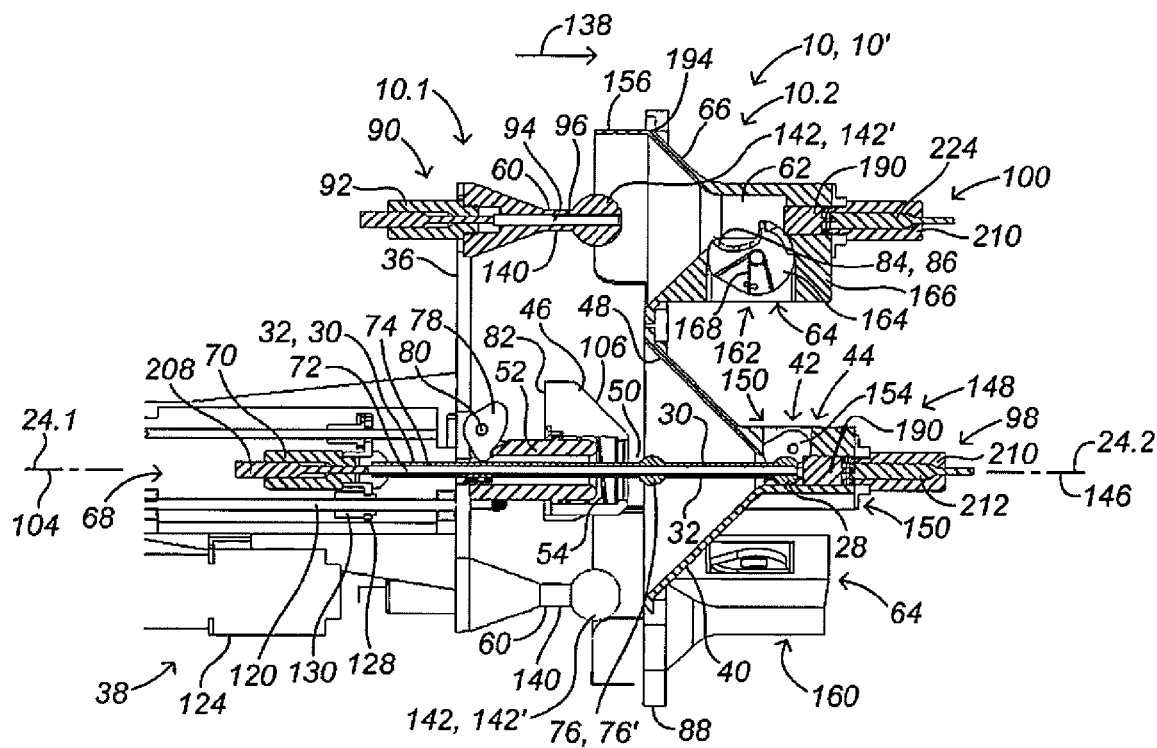
FIG. 11 illustrates a culmination of a soft-docking process of the docking system, resulting in a soft dock capture thereof.

Referring to FIG. 11, the docking cable assembly 32 is further extended by the linear actuator 38—possibly while the chase 12 and target 14 vehicles are propelled further together by the associated thrusters 16, 16' so as to reduce their associated separation distance—until the spherical ball first coupling element 28' at the end of the docking cable assembly 32 either enters the central capture socket 42 of the target portion 10.2 of the docking system 10 directly, or is guided thereinto by the central docking cone 40, and thereafter until the spherical ball first coupling element 28' engages the latch levers 154 of the central latch assemblies 150 of the central capture mechanism 44 associated with the central capture socket 42, and depresses the forward edge portion 180 of the shaped quadrant 178 of the associated latch levers 154, thereby causing the latch levers 154 to rotate about their associated pivots 176, thereby causing a capture surface of an aft edge portion 182 of the shaped quadrant 178 of the associated latch levers 154 to capture a corresponding aft portion 184 of the spherical ball first coupling element 28', until notches 186 in adjacent quadrants 188 of the latch levers 154 become sufficiently aligned with an aft-biased spring-loaded latch lock piston 190 so as to receive the latch lock piston 190 responsive to the aftward bias force of an associated helical compression spring 192 acting between the latch lock piston 190 and the associated latch assembly housing 152, thereby causing the latch levers 154 to become latched in a closed position, capturing the spherical ball first coupling element 28' of the docking cable assembly 32 therewithin, so that the chase 12 and target 14 vehicles thereby become soft docked. With the latch levers 154 latched in the closed position, the engagement of the latch lock piston 190 in the notches 186 prevents the latch levers 154 from rotating back into the open position.

When soft docked, the chase 12 and target 14 vehicles are tethered and cannot drift apart. The soft-docking process provides for the capture of the target vehicle 14 by the chase vehicle 12 by a method that imparts little or no force on the target vehicle 14. Furthermore, either the amount of initial extension of the docking cable assembly 32 is such, or the docking cable assembly 32 is subsequently retracted by the linear actuator 38 into the chaser portion 10.1 of the docking system 10, so that the spherical ends 142 of the distal auto-alignment load-bearing guideposts 60 of the chaser portion 10.1 of the docking system 10 are forward of the aft boundary 194 of the anti-roll shields 156 of the target portion 10.2 of the docking system 10, which thereby provides for limiting rotation of the chase 12 and target 14 vehicles with respect to one another about the central docking axes 104, 146, the limits occurring when the spherical ends 142 of the distal auto-alignment load-bearing guideposts 60 abut the inside surfaces of the anti-roll shields 156.

Figure 12:
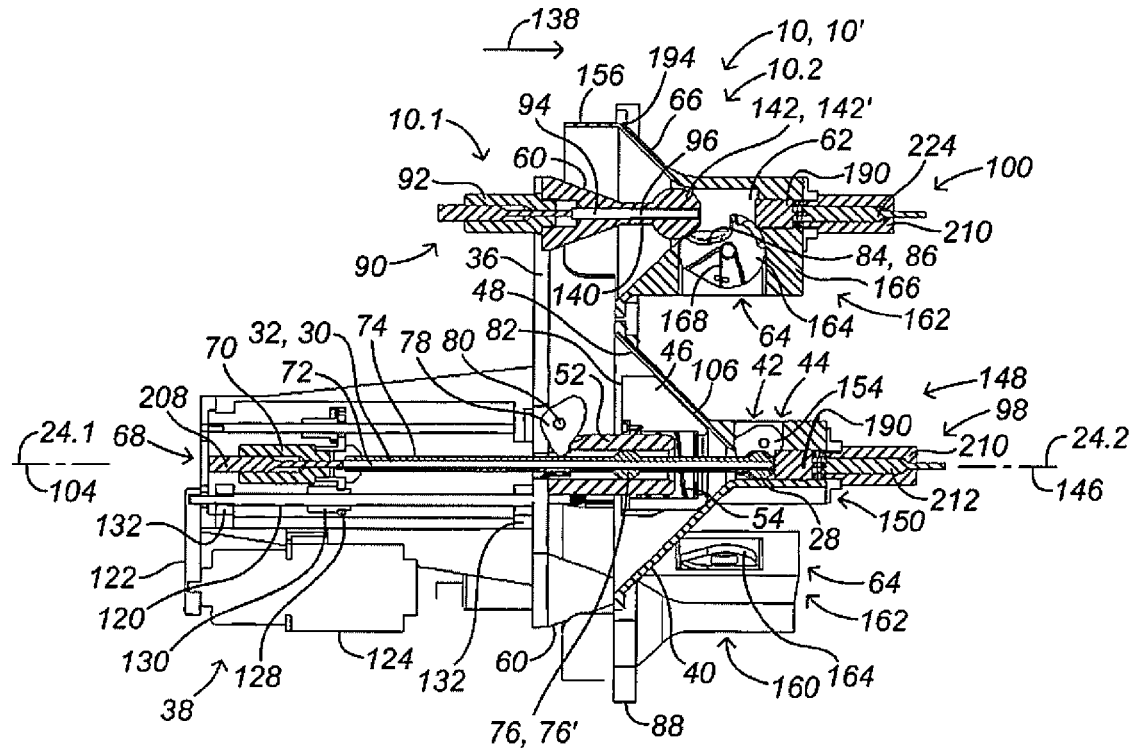
FIG. 12 illustrates a retraction of the docking cable assembly into a chaser portion of the docking system during a hard-docking process of the docking system, resulting in a hard dock thereof.

Referring to FIG. 12, following soft docking, the linear actuator 38 is reversed so as to retract the docking cable assembly 32 into the chaser portion 10.1 of the docking system 10, which brings the chaser 10.1 and target 10.2 portions of the docking system 10 together until the spring-loaded probe head 46 on the chaser portion 10.1 of the docking system 10 contacts the central docking cone 40 of the target portion 10.2 of the docking system 10. The helical compression spring 54 that spring-loads the probe head 46 provides some cushioning of the impact forces that result of the initial hard contact of the probe head 46 with the central docking cone 40, and provides for tolerating misalignment of the chase 12 and target 14 vehicles prior to docking. Furthermore, the engagement of the probe head 46 with the central docking cone 40 provides for at least roughly aligning the central docking axes 104, 146 of the chaser 10.1 and target 10.2 portions of the docking system 10 with one another, thereby mitigating against relatively large-angle pitch and yaw relative misalignments and transverse movement of the chase 12 and target 14 vehicles relative to one another.

As the docking cable assembly 32 is retracted into the chaser portion 10.1 of the docking system 10, and if the chase 12 and target 14 vehicles are misaligned, the spherical ends 142 of one or more of the distal auto-alignment load-bearing guideposts 60 of the chaser portion 10.1 of the docking system 10 interact with corresponding distal docking cones 66 of the target portion 10.2 of the docking system 10, so as to cooperate with the interaction of the probe head 46 with the central docking cone 40 in providing for roughly aligning the central docking axes 104, 146 of the chaser 10.1 and target 10.2 portions of the docking system 10 with one another. As illustrated in FIG. 12, the chase 12 and target 14 vehicles become hard docked after the probe head 46 is fully seated in the central docking cone 40, with the spherical ends 142 of the distal auto-alignment load-bearing guideposts 60 at least commencing entry into the associated distal capture sockets 62.

Figure 13A:
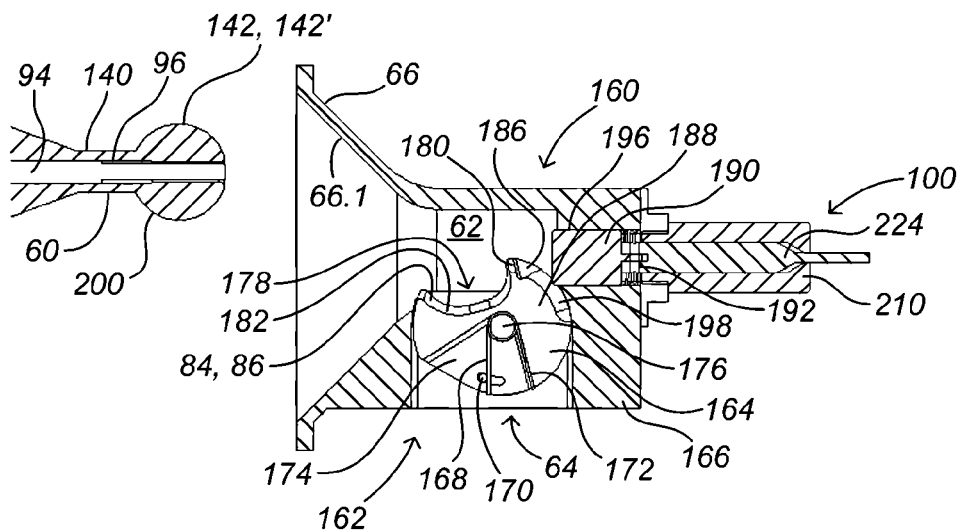
FIG. 13a illustrates an auto-alignment load-bearing guidepost in proximity to a distal docking cone and associated distal capture socket and distal capture mechanism.
Figure 13B:
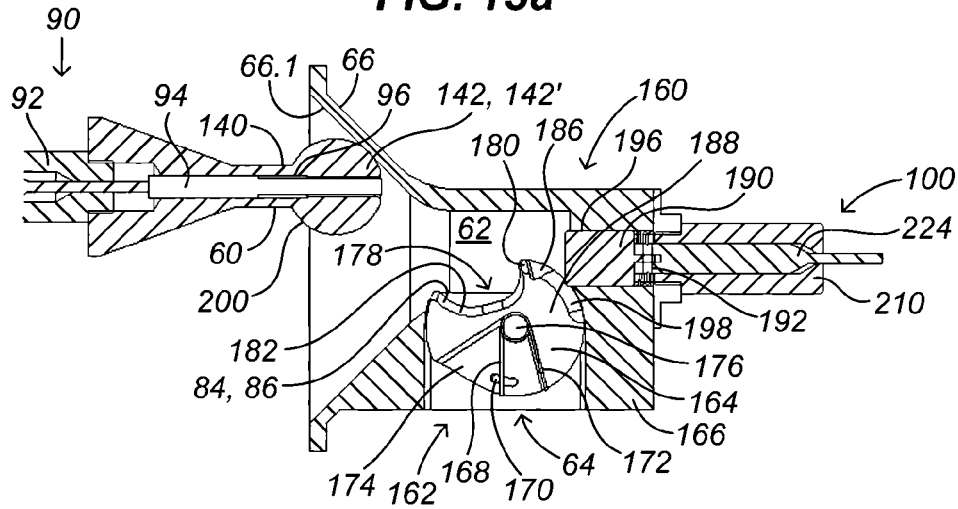
FIG. 13b illustrates an interaction of a spherical end of the auto-alignment load-bearing guidepost with an associated distal docking cone as the auto-alignment load-bearing guidepost is guided into the associated distal capture socket during a docking operation.
Figure 13C:
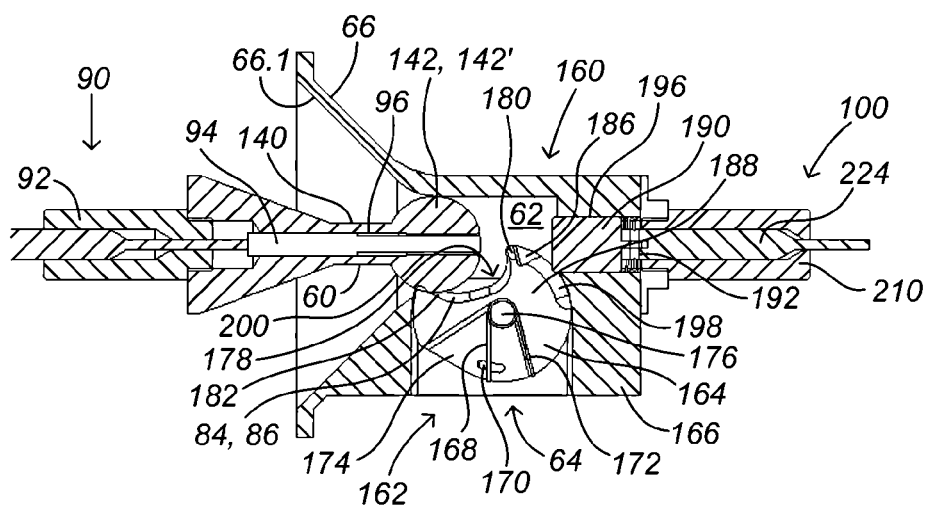
FIG. 13c illustrates the spherical end of the auto-alignment load-bearing guidepost entering the associated distal capture socket and commencing interaction with an associated latch lever of a distal latch assembly during a docking operation.
Figure 13D:
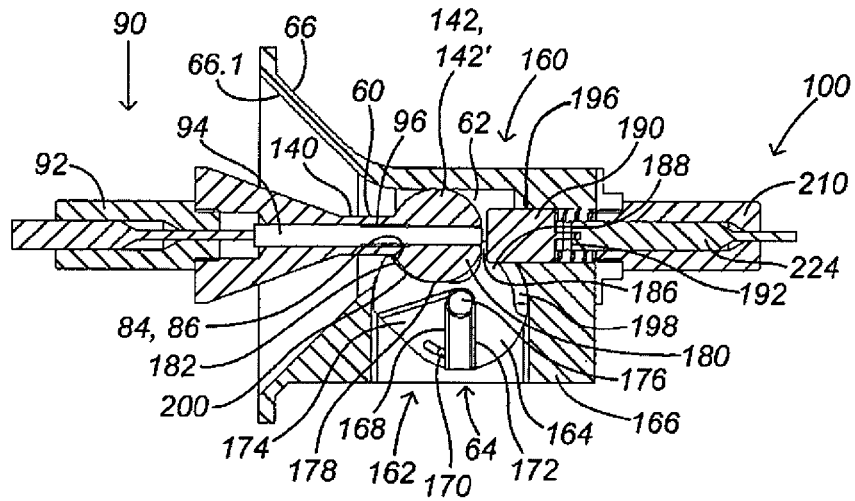
FIG. 13d illustrates the spherical end of the auto-alignment load-bearing guidepost latched within the associated distal capture socket by the latch lever, with the latch lever held in a closed position by an associated latch lock piston engaged with a notch in the latch lever during a docking operation.

FIGS. 13a-13d illustrate the operation of the distal docking cone 66, distal capture socket 62 and distal latch assembly 162, and the process by which an associated distal auto-alignment load-bearing guidepost 60 is captured thereby. In FIG. 13a, the distal auto-alignment load-bearing guidepost 60 is illustrated in proximity to the distal docking cone 66, but misaligned with respect to the associated distal capture socket 62. Referring to FIG. 13b, as the chase 12 and target 14 vehicles are brought closer together, either by the retraction of the docking cable assembly 32, or by the action of the thrusters 16, 16' on the chase 12 or target 14 vehicles, eventually the spherical end 142' of the distal auto-alignment load-bearing guidepost 60 contacts the inner surface 66.1 of the distal docking cone 66, and is guided thereby towards and, as illustrated in FIG. 13c, into the distal capture socket 62 as the chase 12 and target 14 vehicles are continued to be brought closer together. Accordingly, as illustrated in FIGS. 13a-13c, the distal docking cone 66 provides for accommodating roll and positional misalignments of the chase 12 and target 14 vehicles during a docking operation. The latch lever 164 in the distal latch assembly 162 is rotationally biased in an open position by an associated helical torsion springs 168 that acts between a pin 170 depending from the associated latch assembly housing 166 and an edge 172 of a recess 174 on a side of the latch lever 164, wherein the latch lever 164 is adapted to rotate about a pivot 176 depending from the latch assembly housing 166. One shaped quadrant 178 of the latch lever 164 is shaped in cooperation with the associated distal capture socket 62 so as to provide for receiving the associated spherical end 142' of the distal auto-alignment load-bearing guideposts 60. For example, FIG. 13c illustrates the spherical end 142' of the distal auto-alignment load-bearing guideposts 60 entering the shaped quadrant 178 of the latch lever 164. The distal latch assembly 162 further comprises a latch lock piston 190 adapted to slide within a bore 196 in the latch assembly housing 166, and aftwardly biased by an associated helical compression spring 192 acting between the latch lock piston 190 and the associated latch assembly housing 166, so as to cause the latch lock piston 190 to ride against an outer radial surface 198 of an adjacent quadrant 188 of the latch lever 164 that is adjacent to the shaped quadrant 178. Referring to FIG. 13d, as the chase 12 and target 14 vehicles are continued to be brought closer together after the hard docking thereof and during an initial phase of a subsequent rigidization process, the spherical end 142' of the distal auto-alignment load-bearing guideposts 60 further enters the distal capture socket 62 and further engages the shaped quadrant 178 of the latch lever 164, until eventually depressing a forward edge portion 180 of the shaped quadrant 178 of the latch lever 164, thereby causing the latch lever 164 to rotate about the associated pivot 176, thereby causing a capture surface of an aft edge portion 182 of the shaped quadrant 178 to capture a corresponding aft portion 200 of the spherical end 142' of the distal auto-alignment load-bearing guidepost 60, until a notch 186 in adjacent quadrant 188 of the latch levers 164 becomes sufficiently aligned with an aft-biased spring-loaded latch lock piston 190 so as to receive the latch lock piston 190 responsive to the aftward bias force of the associated helical compression spring 192, thereby causing the latch lever 164 to become latched in a closed position, capturing the spherical end 142' of the distal auto-alignment load-bearing guideposts 60 within the distal capture socket 62. With the latch lever 164 latched in the closed position, the engagement of the latch lock piston 190 in the notch 186 prevents the latch lever 164 from rotating back into the open position.

Figure 14A:
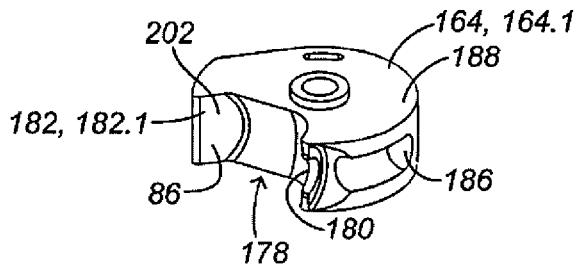
FIG. 14a illustrates a latch lever of a distal latch assembly, wherein the latch lever incorporates a planar load-bearing face.
Figure 14B:
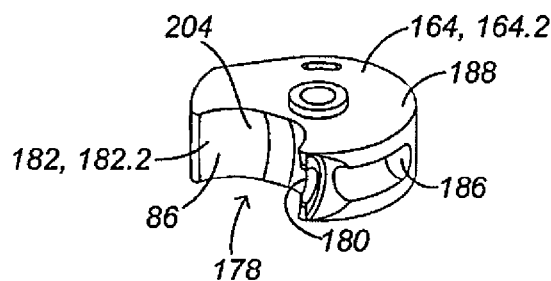
FIG. 14b illustrates a latch lever of a distal latch assembly, wherein the latch lever incorporates a concave spherical load-bearing face.
Figure 14C:
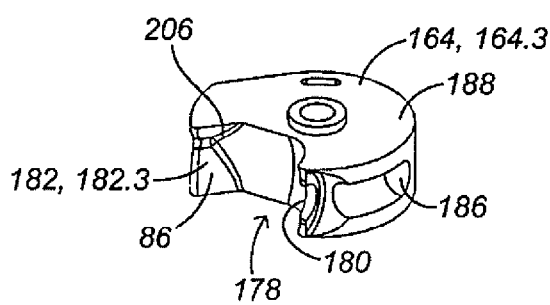
FIG. 14c illustrates a latch lever of a distal latch assembly, wherein the latch lever incorporates a V-groove load-bearing face.

Referring to FIGS. 14a-14c, different latch levers 164, 164.1, 164.2, 164.3 of the three distal latch assemblies 162 incorporate differently shaped aft edge portions 182, 182.1, 182.2, 182.3 of the associated shaped quadrant 178, so that the interfaces between the capture surfaces of the aft edge portions 182.1, 182.2, 182.3 of the associated shaped quadrants 178 of the distal latch assemblies 162, 162.1, 162.2, 162.3 and portions 200 of the corresponding spherical ends 142 of the distal auto-alignment load-bearing guideposts 60 engaged therewith collectively provide for a kinematic triad upon subsequent rigidization of the docking system 10 during a subsequent rigidization process, wherein a kinematic triad is defined as a collection of three sets of contact surfaces in a physical interface with one another that in combination with a preloading force from hard dock an/or rigidization eliminate exactly six degrees of freedom of movement at the interface thereof, without over-constraining that interface, so as to provide for a three-point kinematic rigidization system that provides for relatively precise and repeatable rotational and translational alignment of the chase 12 and target 14 vehicles at the docking interface.

A free rigid body in space has three degrees of freedom in translation (i.e. independent translations along the X, Y, and Z axes), and three degrees of freedom in rotation (i.e. independent rotations about X, Y, and Z axes). Accordingly, a kinematic triad between first and second rigid bodies would therefore prevent relative translation or rotation thereof, so the kinematically, the first and second rigid bodies would therefore act as a single rigid body. For example, one embodiment of a kinematic triad is provided by three spherical or hemispherical surfaces of the first body in respective cooperation with a planar alignment surface, a concave spherical, conical or tri-planar alignment surface, and a V-grooved alignment surface of the second body. As the term is used herein, a tri-planar alignment surface comprises three planar surfaces, each oblique relative to one another and bounding a portion of an associated socket. For example, a retro-reflector is an example of a tri-planar surface for which each of the underlying planar surfaces are orthogonal to one another. A kinematic triad provides for repeatably and precisely aligning two bodies with respect to one another, in both rotation and translation, and for preventing the mating surfaces from binding with one another as a result of interference.

More particularly, referring to FIGS. 14a and 8b, the capture surface of an aft edge portion 182.1 of a first latch lever 164.1 of a first distal latch assembly 162.1 comprises a planar surface 202, which in cooperation with a preloading force from hard dock an/or rigidization provides for constraining one degree-of-freedom of movement. Referring to FIGS. 14b and 8b, the capture surface of an aft edge portion 182.2 of a second latch lever 164.2 of a second distal latch assembly 162.2 comprises a concave spherical, conical or tri-planar surface 204 having a radius of curvature substantially equal to that of the spherical end 142' of the distal auto-alignment load-bearing guideposts 60, which in cooperation with a preloading force from hard dock an/or rigidization provides for constraining three degrees-of-freedom of movement. Finally, referring to FIGS. 14c and 8b, the capture surface of an aft edge portion 182.3 of a third latch lever 164.3 of a third distal latch assembly 162.3 comprises a V-groove surface 206, which in cooperation with a preloading force from hard dock an/or rigidization provides for constraining two degrees-of-freedom of movement. Accordingly, when the aft portions 200 of the distal auto-alignment load-bearing guideposts 60 are loaded against the capture surfaces of aft edge portions 182.1, 182.2, 182.3 of the first 164.1, second 164.2 and third 164.3 latch levers, respectively, during a subsequent rigidization process, exactly six degrees of freedom are eliminated at the interface of the chaser 10.1 and target 10.2 portions of the docking system 10, with no over-constraint, so as to provide for a solid, well-defined load path in the interface, and so as to provide for a deterministic positioning system.

Whereas each distal capture mechanism 64 incorporates a single associated distal latch assembly 162, the central capture mechanism 44 comprises a central trigger latch mechanism 148 incorporating three substantially identical central latch assemblies 150, for example, that are arranged at 120 degree intervals around the central docking axis 146 of the target portion 10.2 of the docking system 10. Each of the three central latch assemblies 150 of the central capture mechanism 44 are similar to the distal latch assembly 162 illustrated in FIGS. 13a-13d, with the exception that each of the associated latch levers 154 incorporate the same type capture surface in the associated aft edge portion 182 thereof. For example, in one embodiment, each aft edge portion 182 of the three latch levers 154 of the three central latch assemblies 150 of the central capture mechanism 44 incorporate a concave spherical, conical or tri-planar surface 204, although alternatively, for example, either a planar surface 202 or a V-groove surface 206 could be used.

Figures 15, 16:
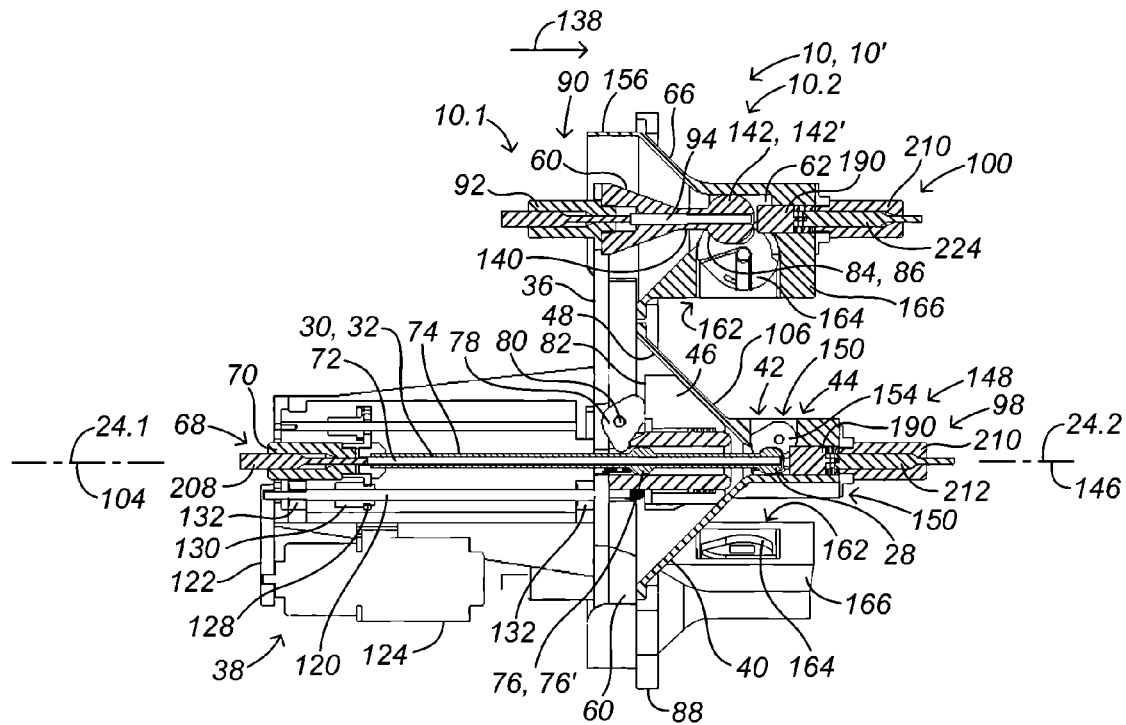
FIG. 15 illustrates a commencement of a rigidization process of the docking system, with the auto-alignment load-bearing guideposts captured within the associated distal capture sockets.
FIG. 16 illustrates a release of the docking cable assembly from the central capture mechanism during a rigidization process of the docking system.

Referring to FIG. 15, following the hard docking of the chase 12 and target 14 vehicles, with the probe head 46 seated in the central docking cone 40, and the distal auto-alignment load-bearing guideposts 60 entering the associated distal capture sockets 62, for example, as illustrated in FIGS. 12 and 13c, the docking cable assembly 32 is further retracted into the chaser portion 10.1 of the docking system 10 so as to provide for capturing the spherical ends 142 of the distal auto-alignment load-bearing guideposts 60 in the distal capture sockets 62 with the distal capture mechanisms 64, and the further retraction of the docking cable assembly 32 compresses the probe head 46 against the associated helical compression spring 54, thereby increasing the compressive force on the central docking cone 40 by the probe head 46 while also increasing the tension in the docking cable assembly 32 and the associated compressive force by the aft portion 184 of the spherical ball first coupling element 28' against the capture surfaces of the aft edge portion 182 of the latch levers 154 of the central latch assemblies 150 of the central capture mechanism 44, which partially rigidizes the interface between the chaser 10.1 and target 10.2 portions of the docking system 10. The further retraction of the docking cable assembly 32 continues until the latch levers 164 of the distal latch assemblies 162 are all latched in the closed position, as illustrated in FIGS. 13d and 15. The chaser 10.1 and target 10.2 portions of the docking system 10 are physically coupled, although prior to the final rigidization process, the interface therebetween still provides for some relative movement thereof. The distal auto-alignment load-bearing guideposts 60 seated in the distal capture sockets 62 provide for substantial roll alignment for of the chaser 10.1 and target 10.2 portions of the docking system 10.

Figure 17A:
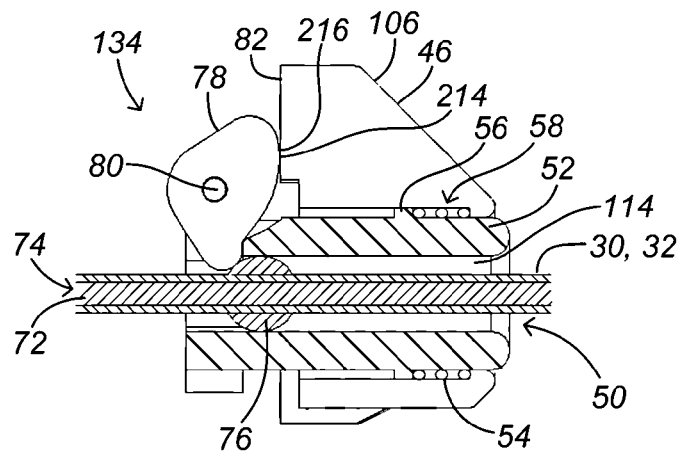
FIGS. 17a-17c illustrate the operation of a cam-actuated loading mechanism used to rigidize the docking system.
Figure 17B:
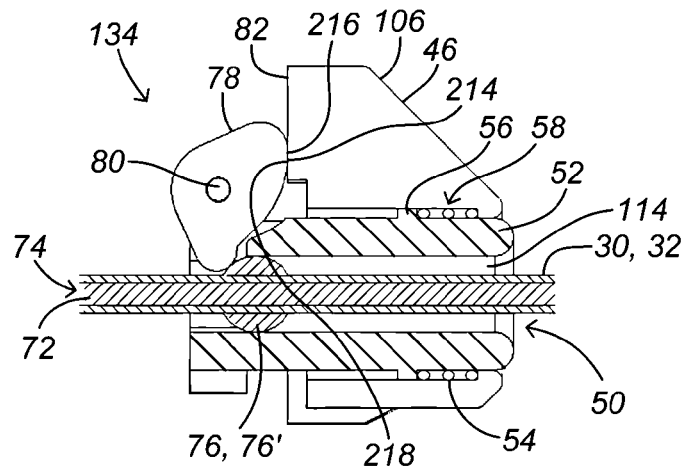
Figure 17C:
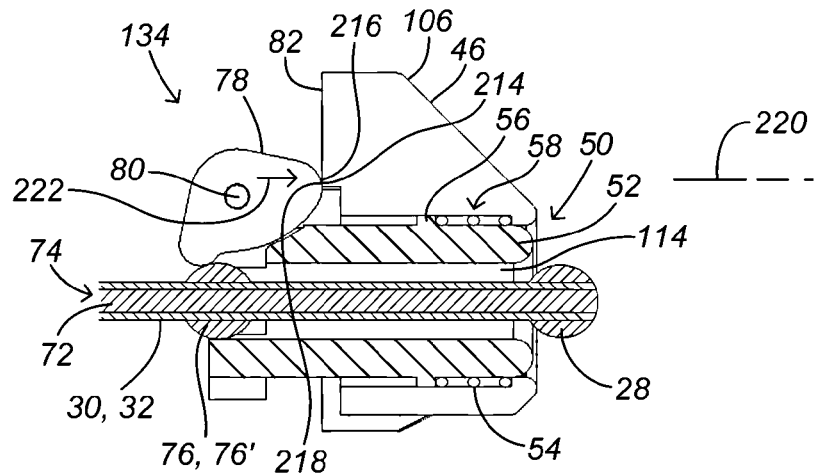
Figure 18:
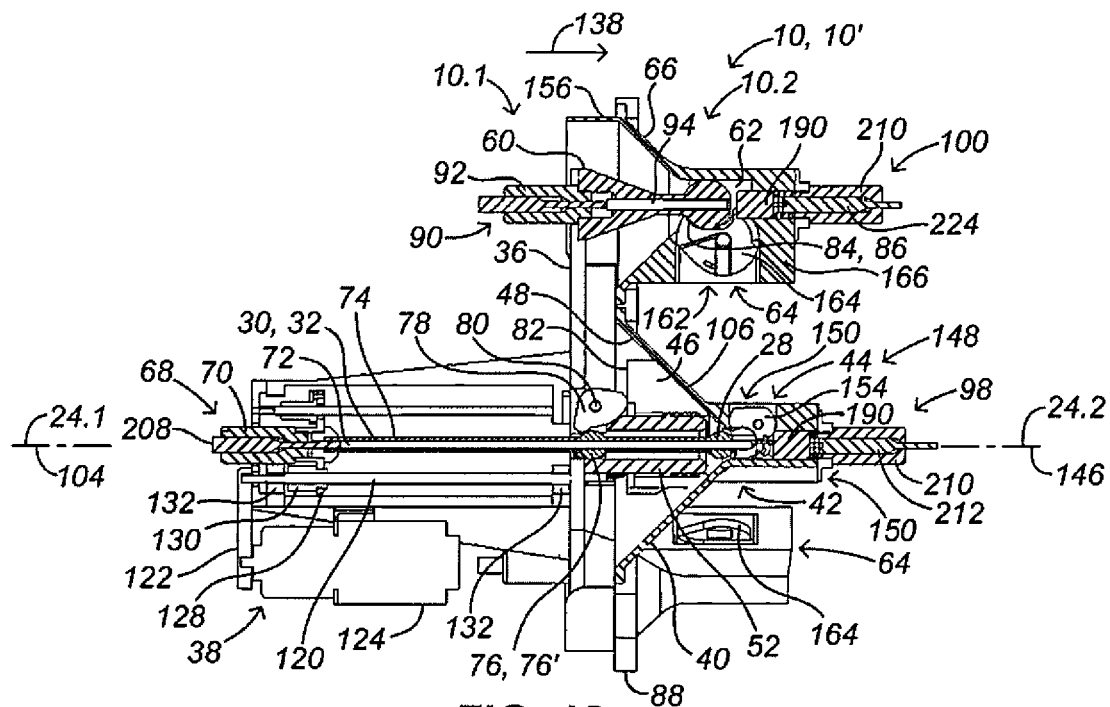
FIG. 18 illustrates a culmination of the rigidization process of the docking system.

Referring to FIG. 16, following capture of the distal auto-alignment load-bearing guideposts 60 by the corresponding distal capture mechanisms 64, the release solenoid 70 of the primary central release mechanism 68 is actuated so as to cause the associated central push rod 72 to slide within the central bore 74 of the docking cable assembly 32 and press against the latch lock piston 190 until the latch lock piston 190 is released from engagement with the notches 186 in the adjacent quadrants 188 of the latch levers 154 of the central latch assemblies 150, thereby enabling each of the latch levers 154 of the central latch assemblies 150 to rotate to the open position, responsive to the bias torsion provided by the helical torsion springs 168 and to the aft force of the spherical ball first coupling element 28' against the capture surfaces of the aft edge portions 182 of the latch levers 154 responsive to the tension in the docking cable assembly 32, thereby releasing the spherical ball first coupling element 28' from capture by the central trigger latch mechanism 148. Alternatively, the tension in the docking cable assembly 32 can be at least partially relaxed in conjunction with the actuation of the primary central release mechanism 68 so as to reduce the associated clamping forces on the latch lock piston 190 by the notches 186 of the latch levers 154, so as to provide for, or assist with, the release of the latch lock piston 190 from the notches 186 of the latch levers 154. In various embodiments, the primary central release mechanism 68 may comprise either a single release solenoid 70, or a plurality of redundant release solenoids 70, surrounding either the central push rod 72, or a common plunger 208 operatively associated therewith or a part thereof. Alternative to, or in a redundant addition to, the actuation of the primary central release mechanism 68, the secondary central release mechanism 98, for example, comprising an associated release solenoid 210, or a plurality of redundant release solenoids 210, either surrounding the latch lock piston 190 or surrounding a common plunger 212 operatively connected thereto or a part thereof, may be actuated from the target portion 10.2 of the docking system 10 so as to similarly release the latch lock piston 190 from the notches 186 of the latch levers 154, and thereby provide for releasing the spherical ball first coupling element 28' from capture by the central trigger latch mechanism 148. Following release of the spherical ball first coupling element 28' from capture by the central trigger latch mechanism 14, the docking cable assembly 32 is retracted into the chaser portion 10.1 of the docking system 10 by the linear actuator 38 until, as illustrated in FIGS. 16 and 17a, first the spherical linearly-actuated cam element 76' on the docking cable assembly 32 contacts the associated rotary cam followers 78, and then, as illustrated in FIGS. 17b-c is further retracted so as to rotate the rotary cam followers 78 with the spherical linearly-actuated cam element 76', and thereby apply a forward-directed compressive force to the probe head 46, which similarly applies a forward-directed compressive force to the central docking cone 40, which acts to separate the chaser 10.1 and target 10.2 portions of the docking system 10, the separation of which is resisted by the distal auto-alignment load-bearing guideposts 60 captured by the distal capture mechanisms 64 within the distal capture sockets 62, thereby causing the aft portions 200 of the spherical ends 142 of the distal auto-alignment load-bearing guideposts 60 to be forced against the capture surfaces of the aft edge portions 182, 182.1, 182.2, 182.3 of the associated latch levers 164, 164.1, 164.2, 164.3 of the associated distal latch assemblies 162, 162.1, 162.2, 162.3, thereby rigidizing the docking system 10, as illustrated in FIG. 18. In the embodiment illustrated in FIGS. 17a-c, each rotary cam follower 78 operates over a range of about 60 degrees, and each rotary cam follower 78 and its associated pivot 80 are adapted so that when fully rotated against the probe head 46, as is illustrated in FIG. 17c, the point of contact 214 of the forward surface 216 of the rotary cam follower 78 with the aft surface 218 of the probe head 46 is substantially in-line with the pivot 80, so that the line of action 220 of the associated compressive force 222 between the rotary cam follower 78 and the probe head 46 substantially passes through the pivot 80, thereby reducing or substantially eliminating an associated torque on the rotary cam follower 78 from the associated force 222, so as to prevent the rotary cam follower 78 from rotating back, which if rotated back would reduce the force 222 on the probe head 46 and thereby relatively loosen the interface between the chaser 10.1 and target 10.2 portions of the docking system 10. Accordingly, the rotary cam follower 78 becomes substantially rigidly locked in position, so as to maintain the rigidization force 222 acting between the probe head 46 and the central docking cone 40, and acting between the distal auto-alignment load-bearing guideposts 60 and the associated distal latch assemblies 162, 162.1, 162.2, 162.3.

With the capture surfaces of the aft edge portions 182, 182.1, 182.2, 182.3 of the associated latch levers 164, 164.1, 164.2, 164.3 of the associated distal latch assemblies 162, 162.1, 162.2, 162.3 adapted, for example, as described hereinabove, so as to provide for a kinematic triad, then upon rigidization of the docking system 10, the engagement of a first distal auto-alignment load-bearing guidepost 60 with the planar surface 202 of the first aft edge portion 164.1 of a first latch lever 164.1 of a first distal latch assembly 162.1 in combination with the engagement of a second distal auto-alignment load-bearing guidepost 60 with the concave spherical, conical or tri-planar surface 204 of the second aft edge portion 182.2 of a second latch lever 164.2 of a second distal latch assembly 162.2 in combination with the engagement of a third distal auto-alignment load-bearing guidepost 60 with the V-groove surface 206 of the third aft edge portion 182.3 of a third latch lever 164.3 of a third distal latch assembly 162.3 provides for eliminating six degrees of freedom, thereby providing for absolute repeatable relative positioning of the chaser 10.1 and target 10.2 portions of the docking system 10.

Figure 19A:
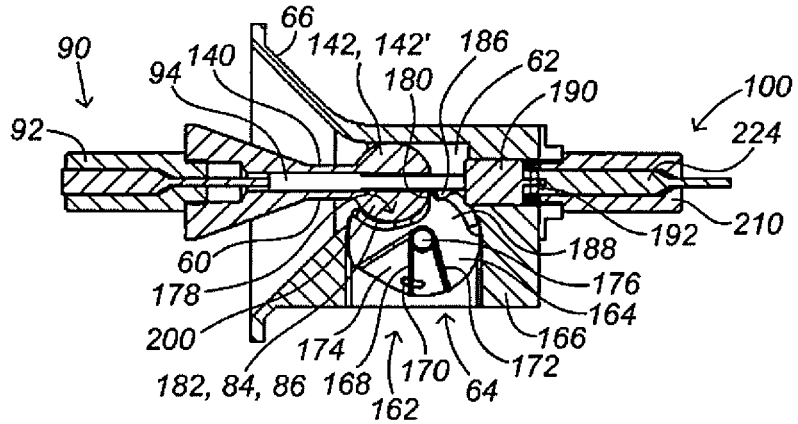
FIGS. 19a and 19b illustrated a release of a distal latch assembly during an undocking operation of the docking system.
Figure 20:
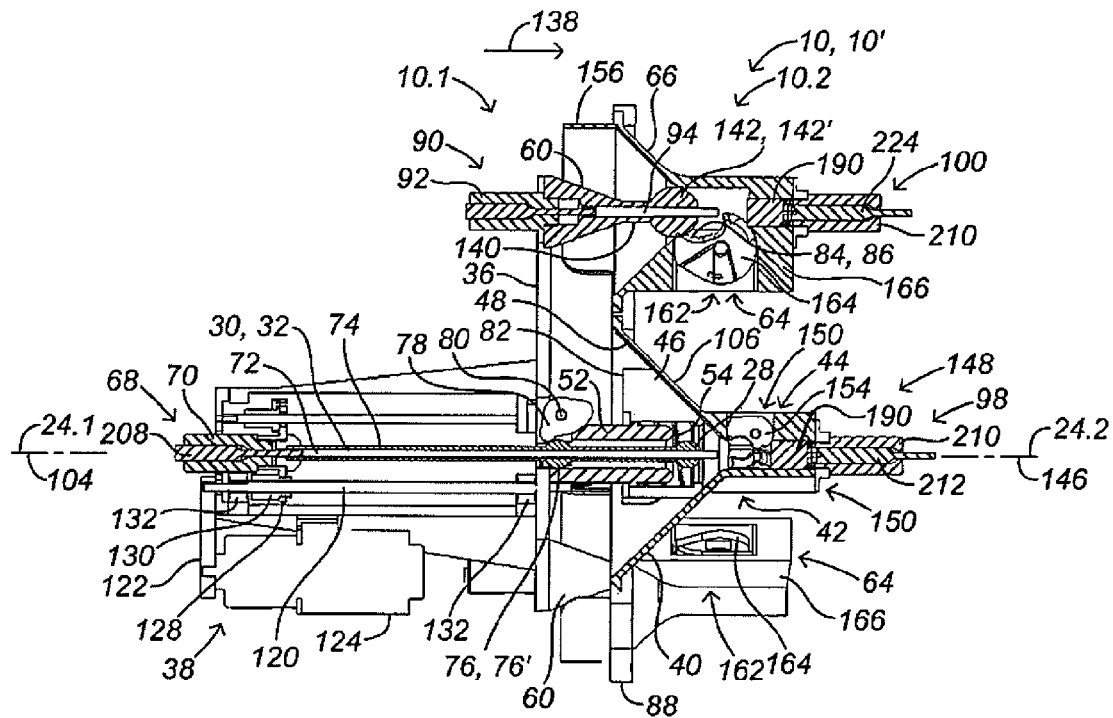
FIG. 20 illustrates a release of the auto-alignment load-bearing guideposts from the associated distal capture sockets responsive to an extension of a spring-loaded probe head during an undocking operation of the docking system.

Referring to FIGS. 19a and 20, the chaser 10.1 and target 10.2 portions of the docking system 10 are undocked from one another by withdrawing each of the latch lock pistons 190 from engagement with the corresponding notches 186 in the latch levers 164 of the distal latch assemblies 162, 162.1, 162.2, 162.3, either as illustrated in FIGS. 19a and 20, by activating the primary distal release mechanisms 90 from the chaser portion 10.1 of the docking system 10 so as to cause the central push rods 94 to slide within the corresponding central bores 96 of the corresponding distal auto-alignment load-bearing guideposts 60 and press the corresponding latch lock pistons 190 forwards so as to disengage the corresponding notches 186 in the latch levers 164 of the distal latch assemblies 162, 162.1, 162.2, 162.3, or by activating the secondary distal release mechanisms 100 from the target portion 10.2 of the docking system 10 so as to directly move the corresponding latch lock pistons 190 forwards so as to disengage the corresponding notches 186 in the latch levers 164 of the distal latch assemblies 162, 162.1, 162.2, 162.3. For example, each primary distal release mechanism 90 may comprise a release solenoid 92, or a plurality of redundant release solenoids 92, surrounding either the associated central push rod 94, or a common plunger 224 operatively associated therewith or a part thereof. Similarly, for example, each secondary distal release mechanism 100 may comprise a release solenoid 210, or a plurality of redundant release solenoids 210, either surrounding the latch lock piston 190 or surrounding a common plunger 212 operatively connected thereto or a part thereof. Following the release of the latch levers 164 of the distal latch assemblies 162, 162.1, 162.2, 162.3 by the disengagement of the latch lock pistons 190 from the notches 186 in the latch levers 164, the latch levers 164 rotate to an open position responsive to the force of the probe head 46 against the central docking cone 40 acting to separate the chaser 10.1 and target 10.2 portions of the docking system 10 from one another, and responsive to the bias torque on the latch levers 164 from the associated helical torsion springs 168.

Figure 19B:
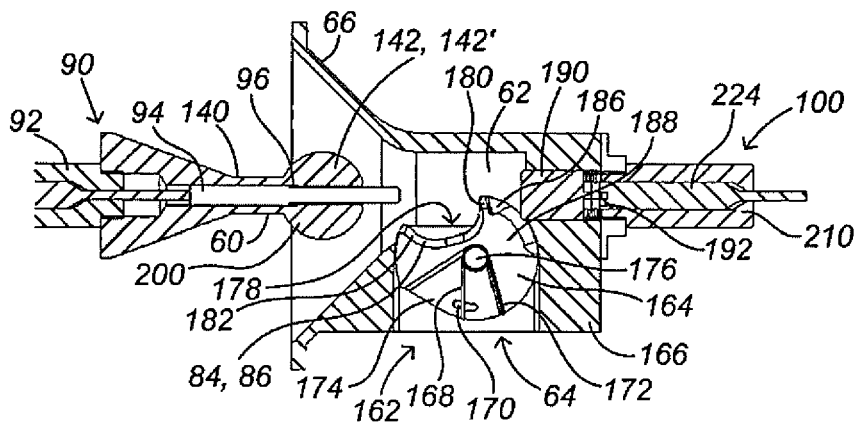
Figure 21:
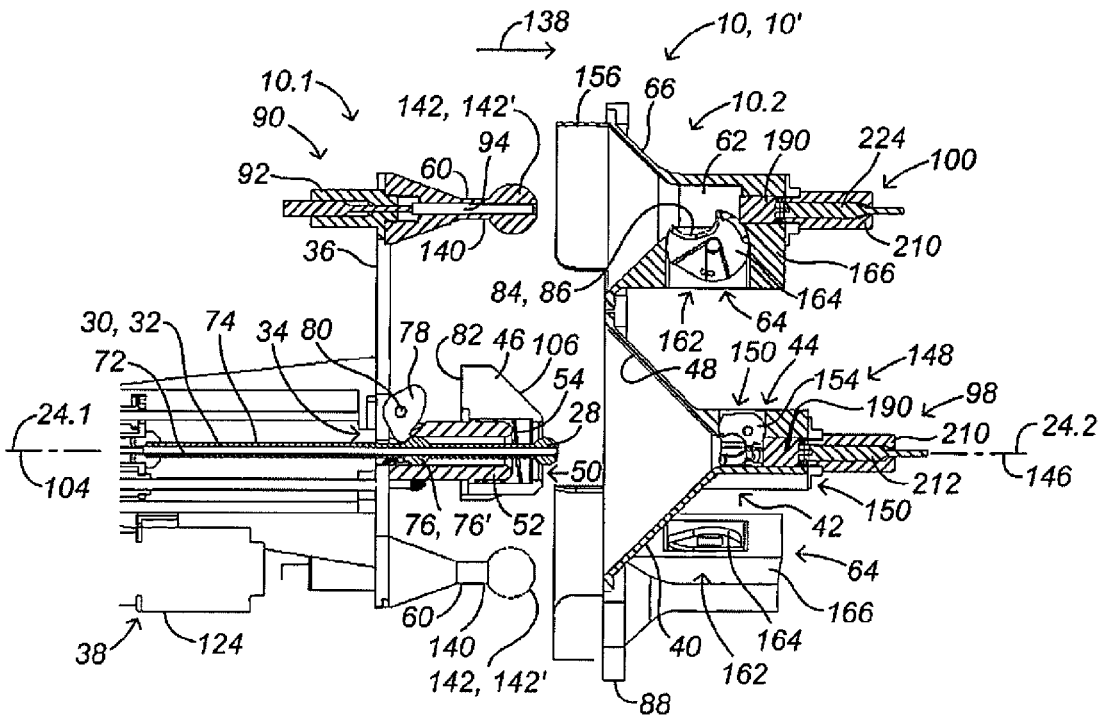
FIG. 21 illustrates a separation of the following an undocking operation of the docking system, with the elements of the chaser and target portions of the docking system returned to their quiescent states in preparation for a subsequent docking operation.

Referring to FIGS. 19b and 21, following the opening of the latch levers 164 of the distal latch assemblies 162, 162.1, 162.2, 162.3, the force of the probe head 46 on the central docking cone 40 from the compressed helical compression spring 54 forces the chaser 10.1 and target 10.2 portions of the docking system 10, and therefore the chase 12 and target 14 vehicles to which they are connected, or of which they are a part, to separate from one another, after which the docking cable assembly 32, the primary 68 and secondary 98 central release mechanisms, and the primary 90 and secondary 100 distal release mechanisms are all returned to their initial state, ready for docking. Following separation of the chase 12 and target 14 vehicles, upon sufficient separation thereof, the associated autonomous guidance, navigation and control systems 20, 20' can then be safely reactivated in order to provide for controlling the attitudes of the chase 12 and target 14 vehicles.

Alternatively, if it were desirable to separate the chase 12 and target 14 vehicles with little to no separation velocity, for example, provided that the associated thrusters 16, 16' could be safely activated with the chase 12 and target 14 vehicles in docking proximity to one another, then the potential energy stored in the compressed helical compression spring 54 could be released prior to releasing the distal capture mechanisms 64 by first recapturing the spherical ball first coupling element 28' of the docking cable assembly 32 with the central capture mechanism 44 by 1) extending the docking cable assembly 32 from the chaser portion 10.1 of the docking system 10 until the spherical ball coupling element 28' is captured by the central capture mechanism 44, as if in a soft-docking process, then 2) retracting the docking cable assembly 32 back into the chaser portion 10.1 of the docking system 10 to release the compressive forces of the aft edge portions 182, 182.1, 182.2, 182.3 of the latch levers 164, 164.1, 164.2, 164.3 of the distal latch assemblies 162, 162.1, 162.2, 162.3 on the aft portions 200 of the spherical ends 142 of the distal auto-alignment load-bearing guideposts 60, then 3) then releasing the distal capture mechanisms 64, and then 4) extending the docking cable assembly 32 from the chaser portion 10.1 of the docking system 10 until the helical compression spring 54 acting against the probe head 46 is fully extended, and finally 5) releasing the central capture mechanism 44, thereby leaving the chaser 10.1 and target 10.2 portions of the docking system 10 free to be separated from one another under the action of the thrusters 16, 16' of the chase 12 or target 14 vehicles.

The above-described docking system 10 provides for a number of redundancies that provide for enhanced reliability. For example, as described above, both the central 44 and distal 64 capture mechanisms can be released from either the chaser 10.1 or target 10.2 portions of the docking system 10, so, for example, if the either the primary central release mechanism 68 or the primary distal release mechanisms 90 of the chaser portion 10.1 of the docking system 10 should fail to release the central capture mechanism 44 or the distal capture mechanisms 64, then the corresponding secondary central release mechanism 98 or secondary distal release mechanisms 100 of the target portion 10.2 of the docking system 10 can be activated to provide for the release of the central 44 and distal 64 capture mechanisms as necessary during either the associated docking or undocking processes. Furthermore, each of the primary central release mechanism 68, primary distal release mechanisms 90, secondary central release mechanism 98, and secondary distal release mechanisms 100 can be implemented with a plurality of associated redundant associated release solenoids 70, 92, 210 so that if one release solenoid 70, 92, 210 fails to act, the corresponding backup release solenoid 70, 92, 210 can be actuated to release either the central 44 or distal 64 capture mechanism.

In accordance with another aspect of redundancy, in the event of a failure of the central capture socket 42 to capture the first coupling element 28 of the docking cable assembly 32, for example, as a result of either a failure of the docking cable assembly 32 or the associated linear positioning and tensioning system 112 in the chaser portion 10.1 of the docking system 10, or a failure of the central capture socket 42 or the central capture mechanism 44 in the target portion 10.2 of the docking system 10, then the soft-docking process can be forgone in favor of using the thrusters 16, 16' to maneuver the chase 12 and target 14 vehicles into alignment so as to provide for initial contact of the probe head 46 with the central docking cone 40, wherein the associated helical compression spring 54 provides for reducing the associated impact forces following contact. The thrusters 16, 16' can then be used to continue to drive chase 12 and target 14 vehicles closer together, so as to drive the distal auto-alignment load-bearing guideposts 60 into engagement with the corresponding distal docking cones 66 and distal capture sockets 62, followed by capture by the associated distal capture mechanisms 64. Then, if the linear actuator 38, docking cable assembly 32, and linearly-actuated cam element 76 were operative in combination with the rotary cam followers 78 and probe head 46, the linearly-actuated cam element 76 could then be actuated so as to rigidize the docking system 10, so that the docking process could be completed as if there had been no failures.

In accordance with yet another aspect of redundancy, in the event of a failure of the distal auto-alignment load-bearing guideposts 60 to become captured within the distal capture sockets 62 by the distal capture mechanisms 64, then the docking cable assembly 32 connected by the associated first coupling element 28 to the central capture socket 42 by the central capture mechanism 44 could be relied upon as the sole connection between the chaser 10.1 and target 10.2 portions of the docking system 10, with the distal auto-alignment load-bearing guideposts 60 within the distal capture sockets 62, some of which could, but not necessarily all of which would, be captured by the associated distal capture mechanisms 64. Although this arrangement would not provide as much stability or rigidity at the interface between the chaser 10.1 and target 10.2 portions of the docking system 10, this may be adequate depending upon the tolerance for misalignment of the associated transfer devices or conduits 26.1, 26.2.

It should be understood that the central 44 and distal 64 capture mechanism are not limited to the above described central trigger latch mechanism 148 and distal latch assemblies 162, respectively, but include any method or mechanism that provides for automatically capturing the associated first coupling element 28 or distal auto-alignment load-bearing guideposts 60, respectively, together with the capability for release thereof from at least one of either the chaser 10.1 or target 10.2 portions of the docking system 10.

The docking system 10 is not limited to any particular materials of construction, which can be adapted according to the particular application and associated environmental conditions, in accordance with accepted engineering and design practice. For example, for spacecraft applications, the associated structural elements could be constructed of aluminum.

Furthermore, the docking system 10 is not limited to the docking of two vehicles with one another, but can generally be used to releasably couple different objects together. For example, the docking system 10 might be used to provide for robotic systems to releasably couple with objects, for example, container objects, wherein a first portion 10.1 of the docking system 10 could be coupled to or a part of the robotic system, and a second portion 10.2 of the docking system 10 could be coupled to or a part of the object.

It should be understood, that any reference herein to the term "or" is intended to mean an "inclusive or" or what is also known as a "logical OR", wherein the expression "A or B" is true if either A or B is true, or if both A and B are true.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:
1. A first portion of a docking system, comprising:
a. a support structure;
b. a probe head adapted to move along a central axis of said first portion of said docking system, wherein said probe head comprises a convex forward surface adapted to mate with a corresponding central concave surface of a second portion of said docking system, said probe head is biased away from said support structure in a forward direction by a first spring, and said probe head incorporates a central bore along said central axis;

c. a docking cable assembly, comprising:
   i. a flexible tensile element; and
   ii. a linearly-actuated cam element operatively coupled to said flexible tensile element along said flexible tensile element, wherein said docking cable assembly is nominally located along said central axis and is adapted to move nominally along said central axis and through said central bore of said probe head;

d. a first linear actuator, operative between said support structure and said docking cable assembly, wherein said first linear actuator provides for moving said docking cable assembly nominally along said central axis through a central bore in said support structure, and through said central bore of said probe head;

e. at least one rotary cam follower, wherein said at least one rotary cam follower is supported by a pivot operatively coupled to said support structure, a first portion of said at least one rotary cam follower is adapted to contact and cooperate with said linearly-actuated cam element, a second portion of said at least one rotary cam follower is adapted to contact and cooperate with an aft edge portion of said probe head, and said at least one rotary cam follower is adapted in relation to said probe head so that an aftwardly directed force from said flexible tensile element through said linearly-actuated cam element to said first portion of said at least one rotary cam follower in engagement therewith acts to at least one of rotate said at least one rotary cam follower and cause said second portion of said at least one rotary cam follower to apply a forwardly-directed force to said aft edge portion of said probe head; and f. a plurality of distal coupling elements operatively coupled to said support structure, wherein said plurality of distal coupling elements are distally located around said central axis, and each distal coupling element of said plurality of distal coupling elements is extended in a forward direction from said support structure and is adapted to engage with and become releasably captured by a corresponding socket and associated capture mechanism of a mating second portion of said docking system.

2. A first portion of a docking system as recited in claim 1, wherein said linearly-actuated cam element comprises at least a portion of a substantially spherical cam surface.

3. A first portion of a docking system as recited in claim 1, wherein said first linear actuator comprises:
   a. a motor-driven ball screw, wherein said motor-driven ball screw is supported by said support structure;
   b. a ball nut adapted to cooperate with said motor-driven ball screw; and
   c. a shuttle operatively coupled so said ball nut and to said docking cable assembly.

4. A first portion of a docking system as recited in claim 1, wherein said at least one rotary cam follower comprises a plurality of rotary cam followers substantially uniformly located around said docking cable assembly.

5. A first portion of a docking system as recited in claim 1, wherein each said distal coupling element comprises at least a portion of a corresponding substantially spherical coupling surface.

6. A first portion of a docking system as recited in claim 1, further comprising: a hollow stub shaft substantially concentric with said central axis, wherein said probe head is adapted to slide over and along said hollow stub shaft, said first spring comprises a helical compression spring adapted to act between a portion or radial extension of said hollow stub shaft and said probe head, and said docking cable assembly extends and is adapted to act through a bore through said hollow stub shaft.

7. A first portion of a docking system as recited in claim 6, wherein each said at least one rotary cam follower extends through a corresponding slot in said hollow stub shaft.

8. A first portion of a docking system as recited in claim 1, further comprising: a central coupling element operatively coupled to a forward end of said flexible tensile element, wherein said linearly-actuated cam element is located along said flexible tensile element aft of said central coupling element, and said central coupling element is adapted to engage with and become releasably captured by a central socket and associated capture mechanism of a mating second portion of said docking system.

9. A first portion of a docking system as recited in claim 8, wherein said central coupling element comprises at least a portion of a substantially spherical coupling surface.

10. A first portion of a docking system as recited in claim 9, wherein said docking cable assembly comprises a first central bore extending through said flexible tensile element and through said central coupling element, further comprising:
   a. a first central pushrod adapted to slide within said first central bore of said docking cable assembly; and
   b. a second linear actuator operative between said flexible tensile element and said first central pushrod, wherein said second linear actuator and said first central pushrod are adapted so as to provide for extending said first central pushrod to an extended position forward of a corresponding non-extended position.

11. A first portion of a docking system as recited in claim 10, wherein said second linear actuator comprises at least one first solenoid adapted to operate on a first plunger operatively coupled to or a part of said first central pushrod.

12. A first portion of a docking system as recited in claim 11, wherein said at least one first solenoid comprises a plurality of first solenoids, said plurality of first solenoids are concentric with one another, and said plurality of first solenoids are adapted so that at least any one of said plurality of first solenoids provides for said extending said first central pushrod to an extended position beyond said forward end of said central coupling element.

13. A first portion of a docking system as recited in claim 1, further comprising: a plurality of posts, wherein each post of said plurality of posts is operatively coupled to and extends in said forward direction from said support structure, each said distal coupling element is operatively coupled to a forward end of a corresponding said post, each said distal coupling element is larger in transverse dimension than each said corresponding said post, and each of said plurality of posts is adapted to restrain motion of said corresponding distal coupling element in at least both a forward direction and a transverse direction.

14. A first portion of a docking system as recited in claim 13, wherein each said post and said corresponding distal coupling element comprises a corresponding second central bore extending therethrough, further comprising:
   a. a plurality of second central pushrods, wherein each second central pushrod is adapted to slide within a corresponding said second central bore of a corresponding said post and said distal coupling element; and b. a plurality of third linear actuators, wherein for each said second central pushrod and said corresponding said post, at least one of said plurality of third linear actuators is operative between said corresponding said post and said second central pushrod, and said at least one third linear actuator and said each said second central pushrod are adapted so as to provide for extending said each said second central pushrod to an extended position forward of a corresponding non-extended position.

15. A first portion of a docking system as recited in claim 14, wherein said at least one third linear actuator comprises at least one second solenoid adapted to operate on a corresponding second plunger operatively coupled to or a part of said each said second central pushrod.

16. A first portion of a docking system as recited in claim 15, wherein said at least one second solenoid comprises a plurality of second solenoids, said plurality of second solenoids are concentric with one another, and said plurality of second solenoids are adapted so that at least any one of said plurality of second solenoids provides for said extending said each said second central pushrod to an extended position forward of said corresponding non-extended position.

* * * * *